United States Patent
Kathuria et al.

(10) Patent No.: US 10,200,825 B2
(45) Date of Patent: Feb. 5, 2019

(54) EMBMS OVER HOME SHARING ENVIRONMENT

(71) Applicant: QUALCOMM Incorporated, San Diego, CA (US)

(72) Inventors: Gaurav Gopal Kathuria, San Diego, CA (US); Sivaramakrishna Veerepalli, San Diego, CA (US); Kuo-Chun Lee, San Diego, CA (US); Rohit Tripathi, San Diego, CA (US); Uppinder Singh Babbar, San Diego, CA (US); Siddharth Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 14/483,974

(22) Filed: Sep. 11, 2014

(65) Prior Publication Data
US 2015/0334537 A1    Nov. 19, 2015

Related U.S. Application Data

(60) Provisional application No. 61/993,627, filed on May 15, 2014.

(51) Int. Cl.
*H04W 4/06* (2009.01)
*H04W 80/06* (2009.01)
(Continued)

(52) U.S. Cl.
CPC ............ *H04W 4/06* (2013.01); *H04W 80/06* (2013.01); *H04L 12/189* (2013.01); *H04W 88/04* (2013.01)

(58) Field of Classification Search
None
See application file for complete search history.

(56) References Cited

U.S. PATENT DOCUMENTS

2003/0161333 A1* 8/2003 Schain ............... H04L 12/2801
370/401
2005/0076369 A1* 4/2005 Cai ...................... H04L 12/185
725/62

(Continued)

OTHER PUBLICATIONS

3rd Generation Partnership Project; Technical Specification Group Services and System Aspects; Study on architecture enhancements to support Group Communication System Enablers for LTE (GCSE LTE) (Release 12), 3GPP Standard; 3GPP TR 23.768, 3rd Generation Partnership Project (3GPP), Mobile Competence Centre ; 650, Route Des Lucioles ; F-96921 Sophia-Antipolis Cedex; France, vol. SA WG2, No. V12.0.0, Mar. 10, 2014 (Mar. 10, 2014), pp. 1-63, XP050769635, [retrieved on Mar. 10, 2014] paragraph [04.2]—paragraph [04.3]; figures 4.2-1; paragraph [06.4]—[6.5.1]; figures 6.5.1-1.

(Continued)

*Primary Examiner* — Chirag G Shah
*Assistant Examiner* — Suk Jin Kang
(74) *Attorney, Agent, or Firm* — Anthony R. Morris

(57) ABSTRACT

A method, an apparatus, and a computer program product for wireless communication are provided. The apparatus may be a network device. The apparatus receives an evolved multimedia broadcast multicast service (eMBMS) data from a base station via multicast transmission. The apparatus transmits the received eMBMS data to one or more end nodes via unicast transmission. In an aspect, the one or more end nodes are connected to the network device via a local area network (LAN).

82 Claims, 22 Drawing Sheets

(51) Int. Cl.
  *H04L 12/18* (2006.01)
  *H04W 88/04* (2009.01)

(56) References Cited

U.S. PATENT DOCUMENTS

| | | | |
|---|---|---|---|
| 2007/0050820 A1* | 3/2007 | Saarikivi | H04N 21/41407 725/62 |
| 2009/0034557 A1* | 2/2009 | Fluhrer | H04L 41/0893 370/474 |
| 2009/0073980 A1* | 3/2009 | Matsumoto | H04L 12/1886 370/392 |
| 2009/0138610 A1* | 5/2009 | Gobara | H04L 12/4604 709/228 |
| 2009/0232138 A1* | 9/2009 | Gobara | H04L 12/4633 370/392 |
| 2009/0323632 A1* | 12/2009 | Nix | H04L 29/125 370/331 |
| 2012/0239785 A1* | 9/2012 | Pazos | H04L 12/1881 709/219 |
| 2012/0320738 A1* | 12/2012 | Runeson | H04L 69/162 370/221 |
| 2013/0294318 A1* | 11/2013 | Amerga | H04W 4/06 370/312 |
| 2014/0003390 A1 | 1/2014 | Gholmieh et al. | |
| 2014/0036755 A1* | 2/2014 | Lee | H04W 36/26 370/312 |
| 2014/0071884 A1* | 3/2014 | Sherman | H04W 76/10 370/315 |
| 2014/0079038 A1 | 3/2014 | Maeda et al. | |
| 2014/0095668 A1 | 4/2014 | Oyman | |
| 2014/0105044 A1* | 4/2014 | Baillargeon | H04L 43/0835 370/252 |
| 2014/0105060 A1* | 4/2014 | Baillargeon | H04W 24/06 370/253 |
| 2014/0126454 A1 | 5/2014 | Zhang et al. | |
| 2014/0241229 A1* | 8/2014 | Bertorelle | H04W 4/06 370/312 |
| 2014/0359672 A1* | 12/2014 | Lin | H04N 21/44209 725/62 |
| 2014/0364165 A1* | 12/2014 | Kim | H04W 88/06 455/552.1 |
| 2014/0376441 A1* | 12/2014 | Lohmar | H04W 4/06 370/312 |
| 2015/0029925 A1* | 1/2015 | Mantin | H04L 65/608 370/312 |
| 2015/0049762 A1* | 2/2015 | Mantin | H04L 65/4076 370/390 |
| 2015/0172066 A1* | 6/2015 | Gholmieh | H04L 12/189 370/312 |
| 2015/0180676 A1* | 6/2015 | Bao | H04L 12/1886 370/230 |
| 2015/0201249 A1* | 7/2015 | Ryu | H04N 21/6405 725/62 |
| 2015/0270979 A1* | 9/2015 | Andrada | H04L 51/38 370/390 |
| 2015/0271084 A1* | 9/2015 | Nakakes | H04L 47/286 370/392 |
| 2015/0281112 A1* | 10/2015 | Raju | G06F 9/45533 709/226 |
| 2016/0119157 A1* | 4/2016 | Hua | H04W 76/021 370/312 |
| 2017/0295535 A1* | 10/2017 | Sherman | H04W 40/22 |

OTHER PUBLICATIONS

International Search Report and Written Opinion—PCT/US2015/028240—ISA/EPO—dated Aug. 7, 2015.

"3rd Generation Partnership Project; Technical Specitication Group Services and System Aspects; Study on architecture enhancements to support Proximity-based Services (ProSe) (Release 12)", 3GPP Draft; 23703-COO, 3rd Generation Partnership Project (3GPP), Mobile Competence Centre; 650, Route Des Lucioles; F-06921 Sophia-Antipolis Cedex; France, Mar. 10, 2014, XP050906656, pp. 135-138, 154-156. Retrieved from the Internet URL:http://www.3gpp.org/ftp/Specsj2014-12/Rel-12/23 series/ [retrieved on Mar. 10, 2014]; paragraph [03.1]—paragraph [4.3.2]; figures 4.1.3-1; paragraph [5.1.1]; paragraph [06.3]—paragraph [6.3.3.2]; figures 6.3.2.1-1; paragraph [6.3.7]—paragraph [6.3.8.3]; figures 6.3.7.1.2-1; paragraph [6.3.11]—paragraph [6.3.11.4]; figures 6.3.11.1-1.

Vodafone., Additions to 'Solution R9: Reuse of Architecture A1 from TR 36.896' for Public Safety UE-Network Relays 11, 3GPP Draft; S2-133638 REV 3459 Relay Node Internal Routing (2), 3rd Generation Partnership Project (3GPP), Mobile Competence Centre; 659, Route Des Lucioles; F-96921 Sophia-Antipolis Cedex; France, [Online] vol. SA WG2, No. Xiamen, P.R. China; Sep. 23, 2013-Sep. 27, 2013, Sep. 26, 2013 (Sep. 26, 2013), XP050726960, Retrieved from the Internet: URL:http://www.3gpp.org/ftp/tsg_sa/WG2_Arch/TSGS2_99_Xiamen/Docs/ [retrieved on Sep. 26, 2013]; paragraph [6.3.9.1]; figurs 6.3.9.1-1.

* cited by examiner

EMBMS OVER HOME SHARING ENVIRONMENT

CROSS-REFERENCE TO RELATED APPLICATION(S)

This application claims the benefit of U.S. Provisional Application Ser. No. 61/993,627, entitled "EMBMS OVER HOME SHARING ENVIRONMENT" and filed on May 15, 2014, which is expressly incorporated by reference herein in its entirety.

BACKGROUND

Field

The present disclosure relates generally to communication systems, and more particularly, to an evolved Multimedia Broadcast Multicast Service (eMBMS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a network device. The apparatus receives an evolved multimedia broadcast multicast service (eMBMS) data from a base station via multicast transmission. The apparatus transmits the received eMBMS data to one or more end nodes via unicast transmission. In an aspect, the one or more end nodes are connected to the network device via a local area network (LAN).

DETAILED DESCRIPTION

Figure 1:
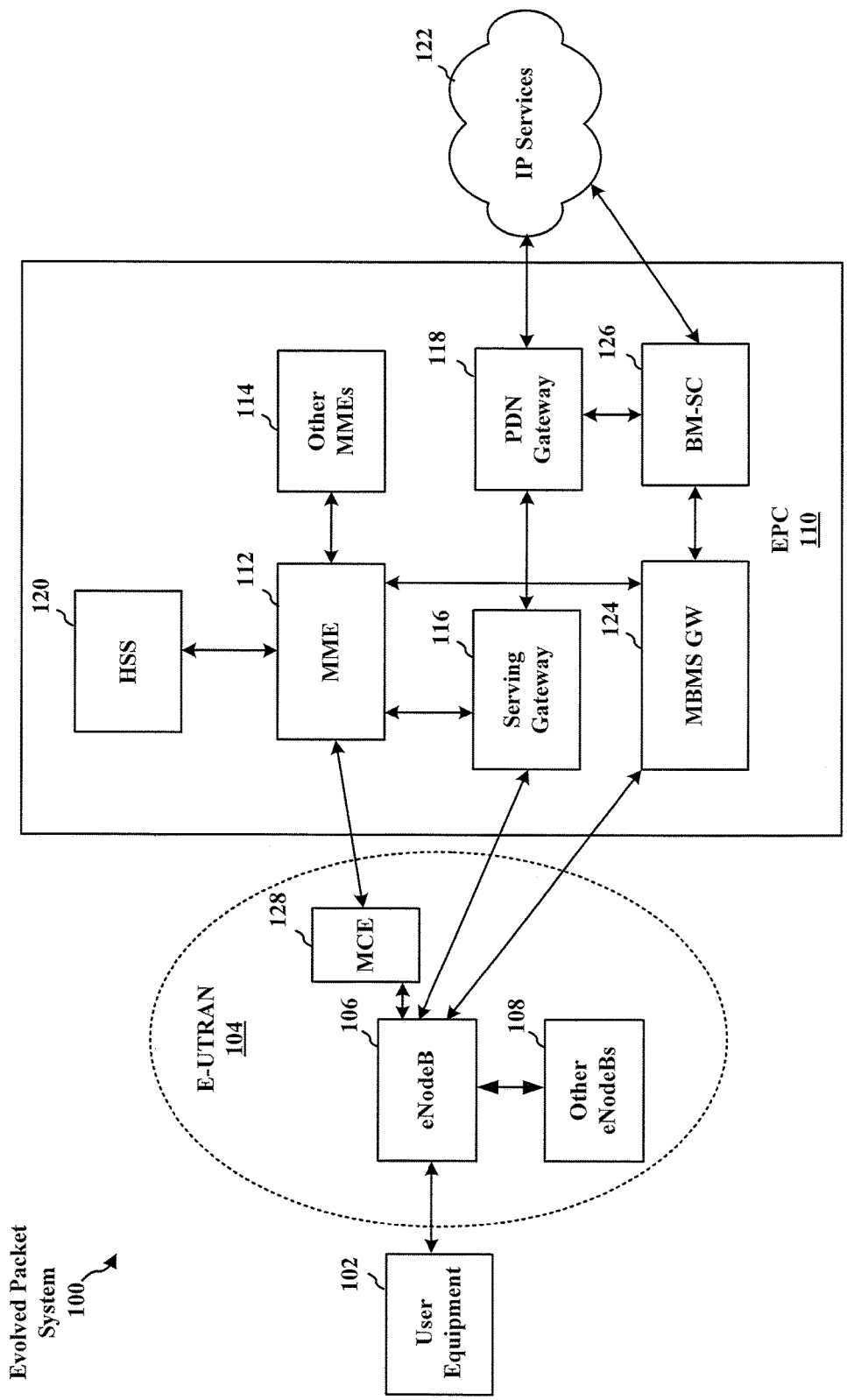
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
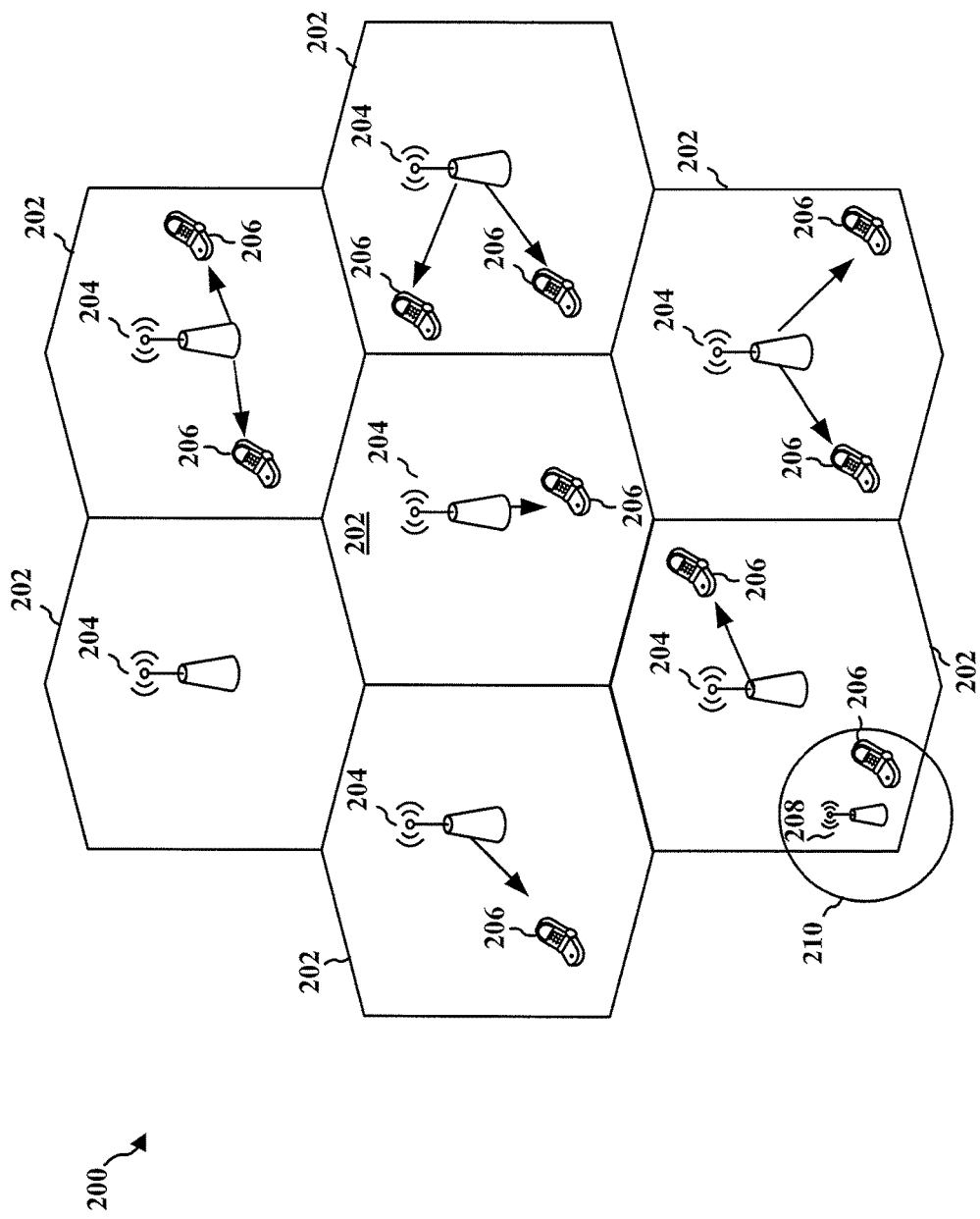
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
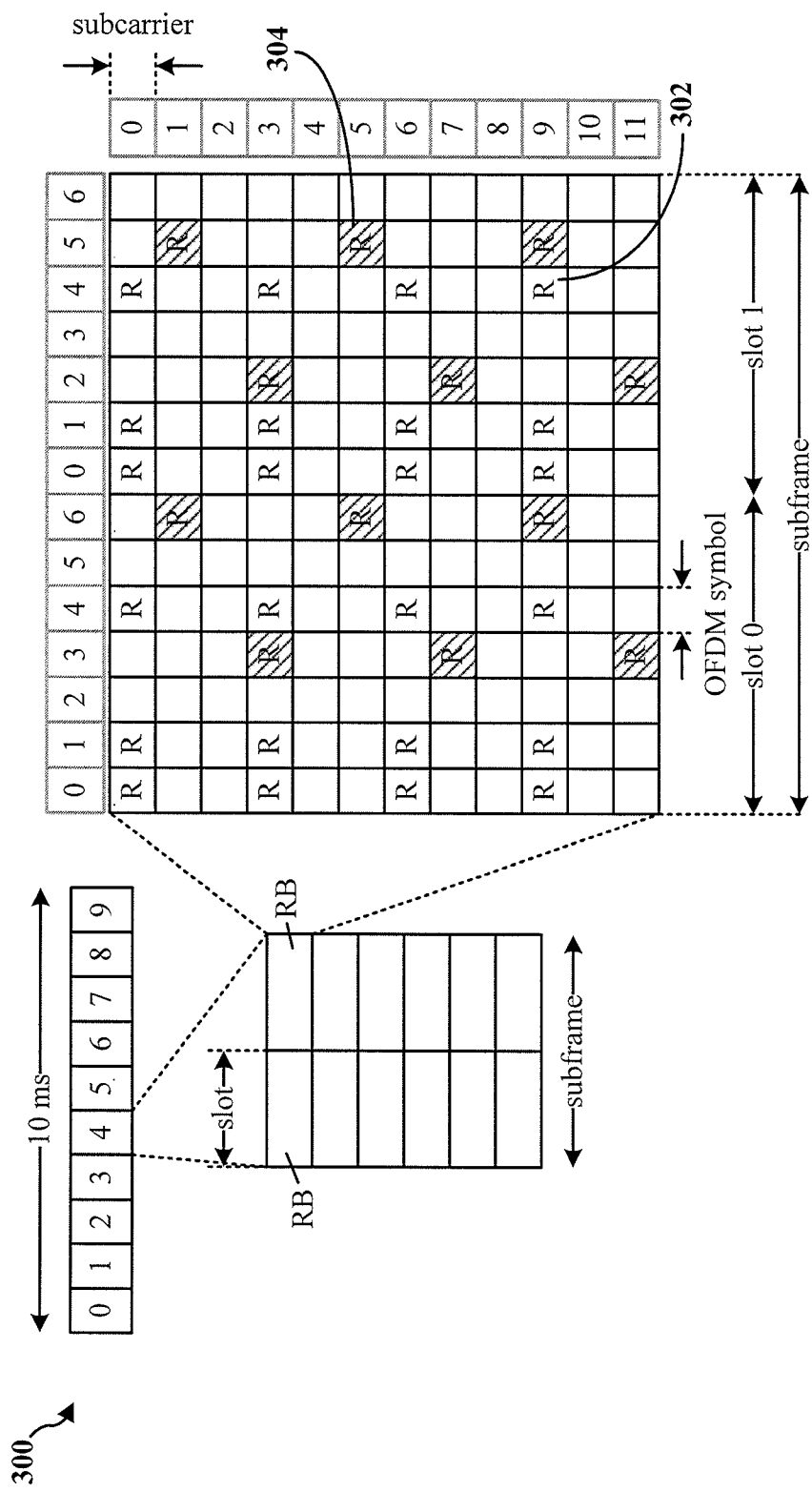
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
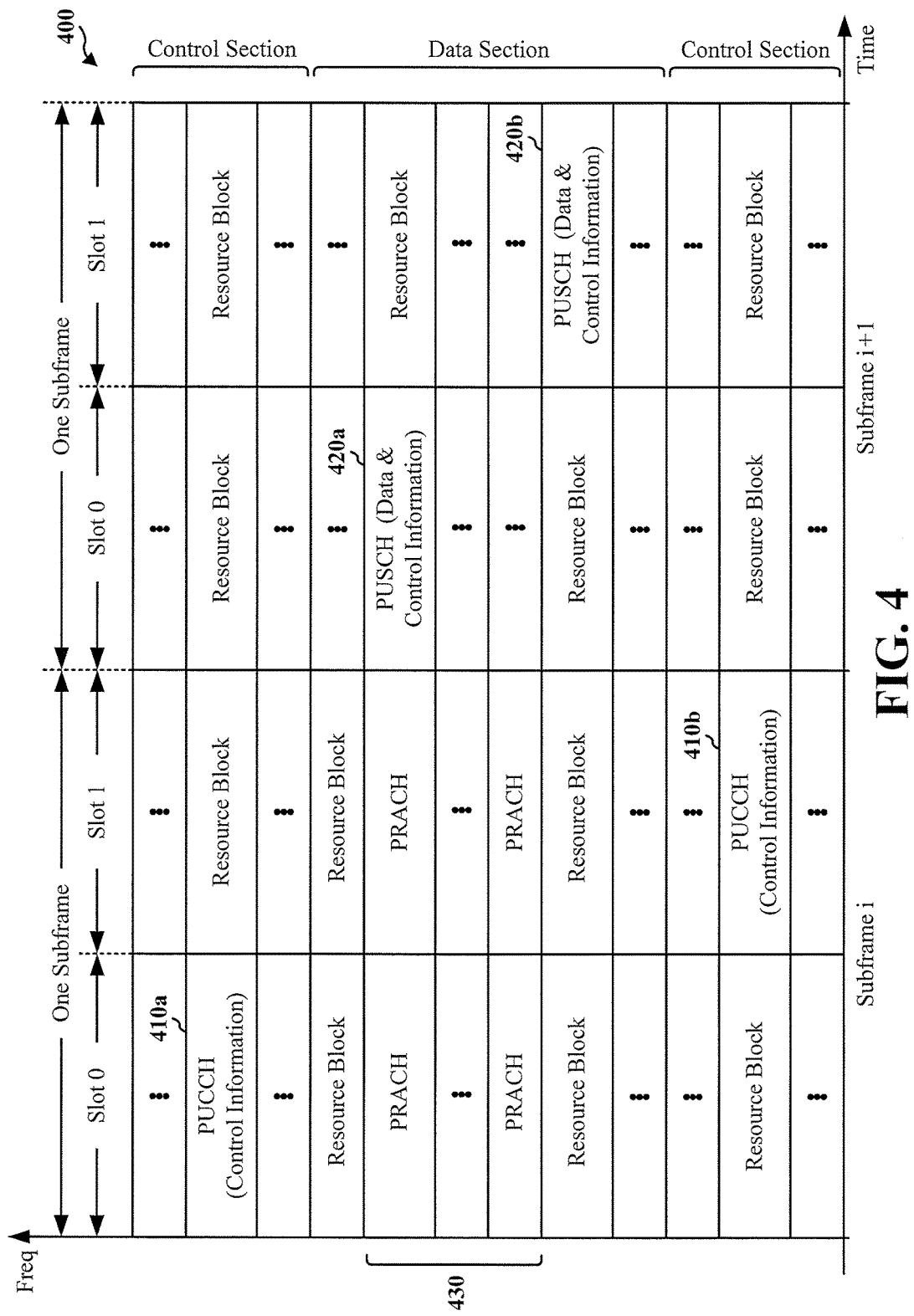
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
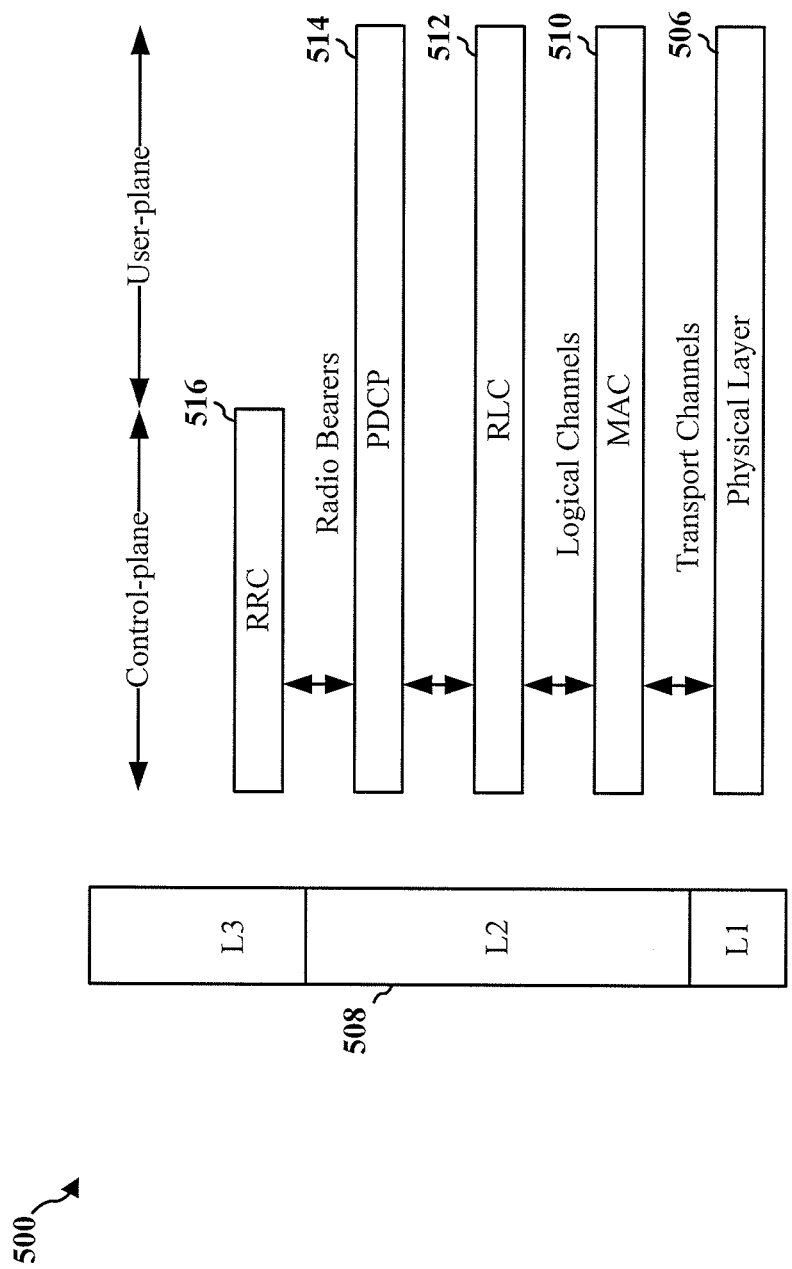
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
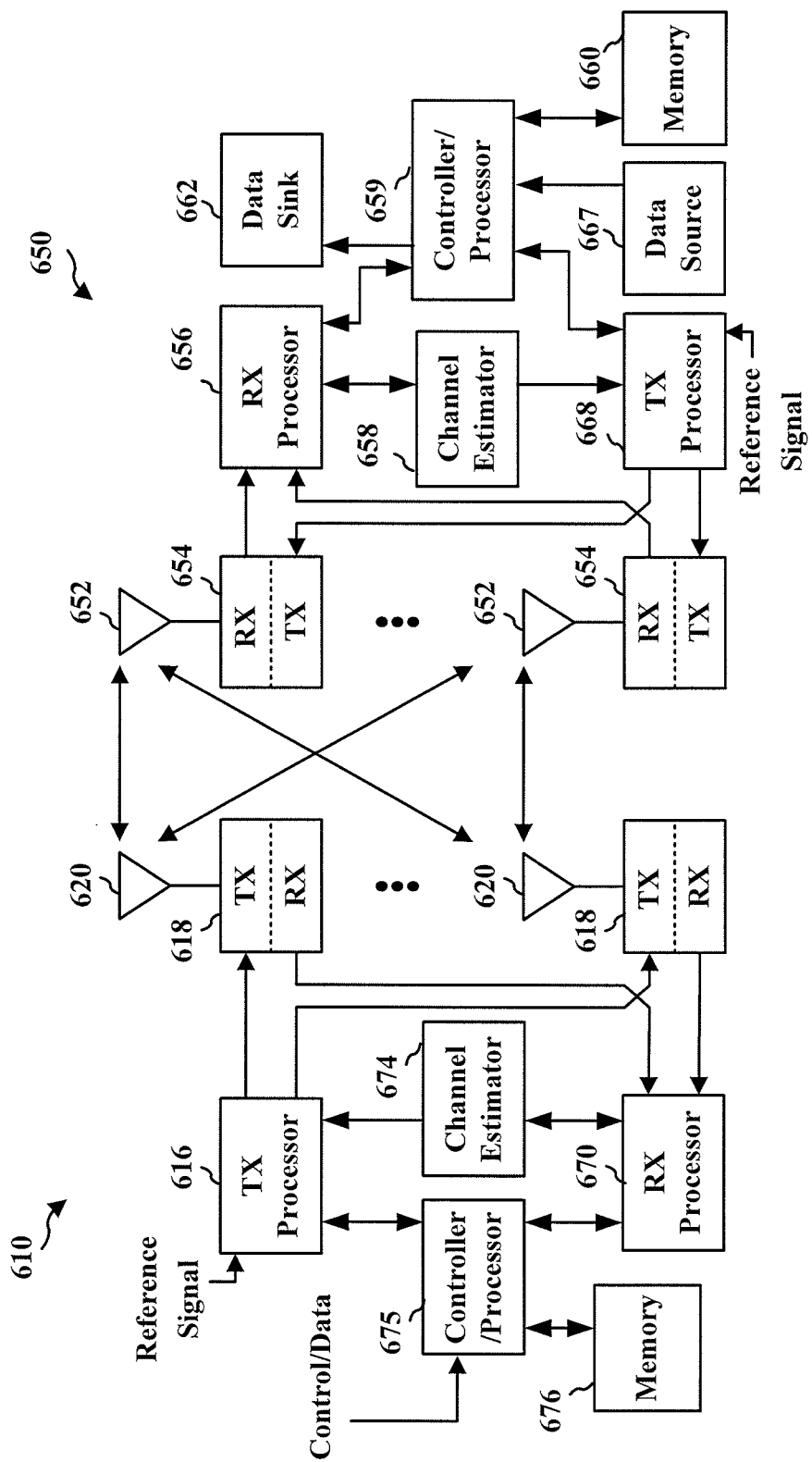
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
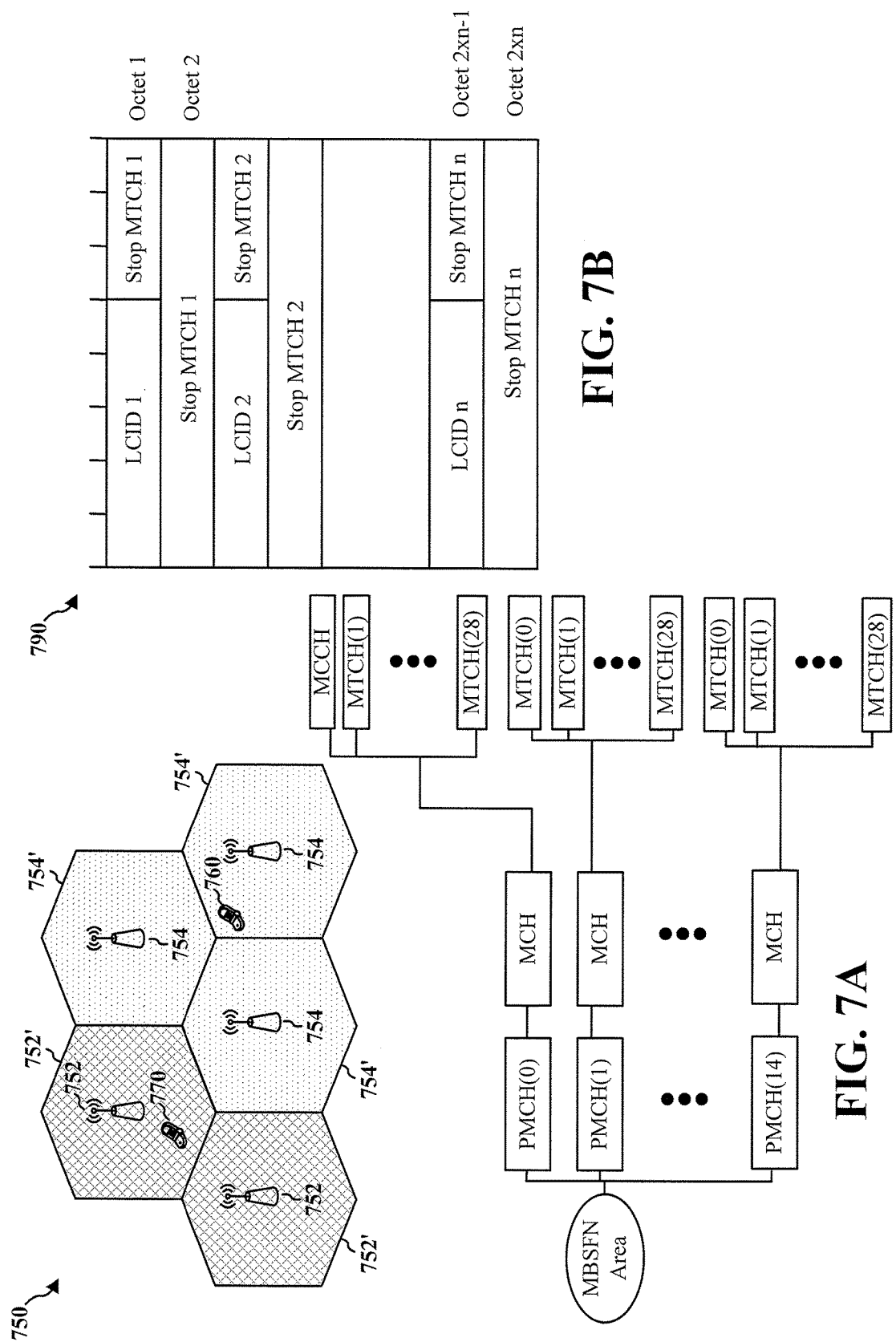
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

An approach to provide eMBMS functionality from a wireless wide area network (WWAN) network (e.g., an LTE network) through a network device to one or more end nodes connected over a local area network (LAN) (e.g., using WiFi and/or USB based tethering) has been suggested. The network device may be a UE, such as the UE 102 of FIG. 1. The end node may be any device that is capable of connecting to the network device over the local area network, such as a computer, a laptop, a handheld device, etc. The eMBMS data is transmitted as a multicast traffic stream by nature. When a network device receives eMBMS data from a network (e.g., a WWAN network) and subsequently provides the eMBMS data to end nodes over the LAN, the network device generally provides the eMBMS data to the end nodes via multicast. However, performance of multicast transmission over the LAN is generally poor, and thus multicast transmission of the eMBMS data (e.g., in eMBMS multicast packets) to the end nodes over the LAN may not be reliable. For example, during a multicast transmission between the network device and the end nodes over the LAN, if at least one link connecting the network device to an end node becomes unreliable, this unreliable link adversely affects the overall multicast transmission to other end nodes. Thus, in multicast transmission over the LAN, one unreliable link to one UE may cause an adverse effect on the overall multicast transmission to multiple UEs. Therefore, an approach to reliably communicate eMBMS data from a network device to end nodes over the LAN is desired.

The present disclosure enables multiple end devices running middleware to reliably receive eMBMS services. The disclosure provides a unicast tunneling protocol and setup methods in order to communicate eMBMS traffic reliably over the LAN. The unicast tunneling protocol may also eliminate a network address translation (NAT) constraint at an intermediate node.

Figure 8:
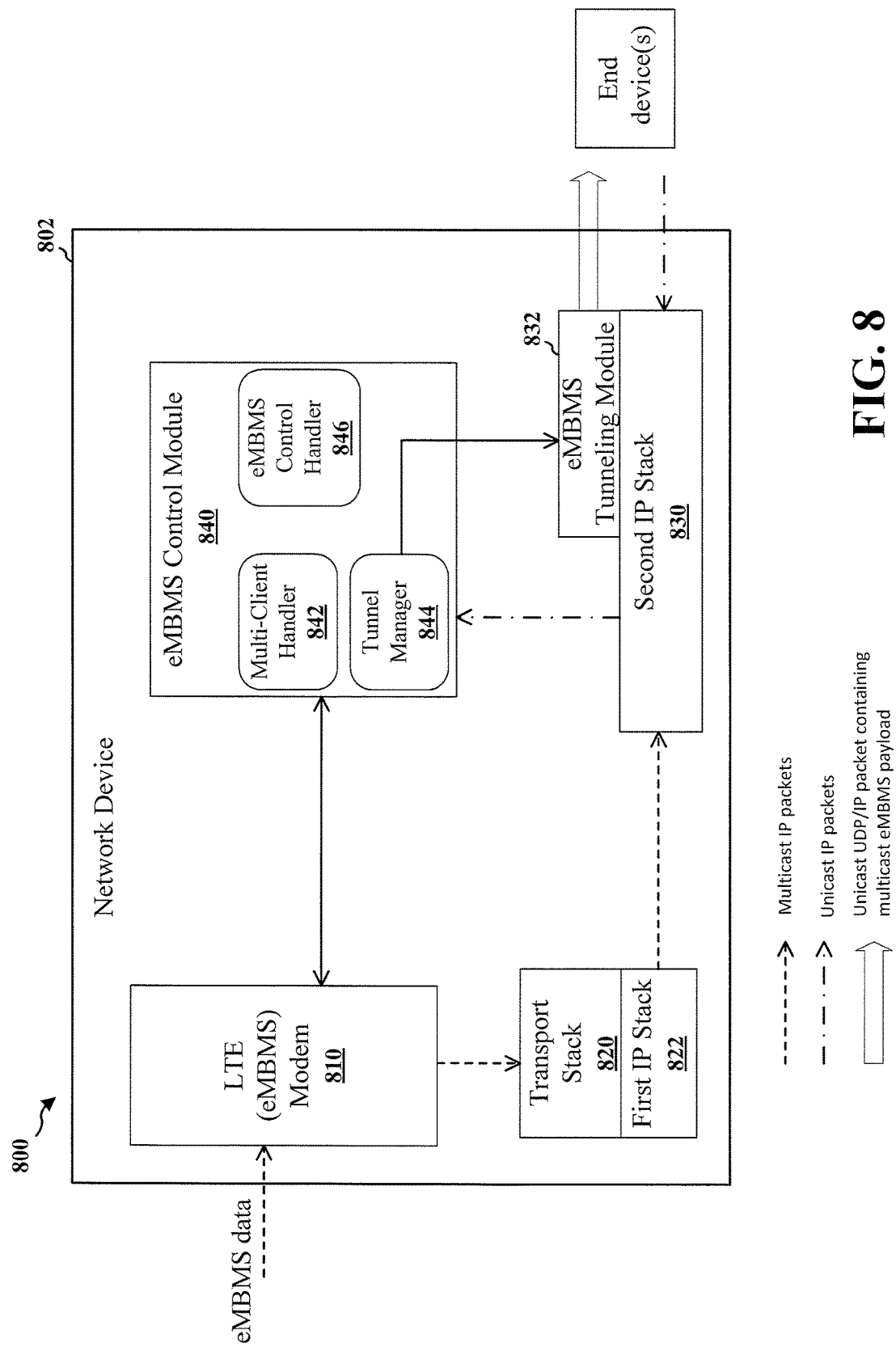
FIG. 8 is an example diagram illustrating a network device structure according to an aspect of the disclosure.

FIG. 8 is an example diagram illustrating a network device structure 800 according to an aspect of the disclosure. The network device 802 is configured to receive multicast packets of eMBMS data from a network (e.g., an LTE network), and to provide unicast packets containing the eMBMS data to one or more end nodes. The network device 802 includes an LTE modem 810, a transport stack (Multicast user datagram protocol (UDP)) 820 stacked with a first IP stack 822, a second IP stack 830 and an eMBMS tunneling module 832, and an eMBMS control module 840. The eMBMS control module 840 includes a multi-client handler 842, a tunnel manager 844, and an eMBMS control handler 846.

The LTE modem 810 receives multicast packets associated with eMBMS data from the network, and subsequently communicates the multicast packets to the transport stack (Multicast UDP) 820 and the first IP stack 822. The first IP stack 822 communicates the multicast packets to the second IP stack 830. The second IP stack 830 subsequently communicates with the eMBMS tunneling module 832 to generate unicast packets based on the received multicast packets. The second IP stack 830 is also configured to receive a unicast signal from another device (e.g., an end node), and to subsequently send the received unicast signal to the eMBMS control module 840. The eMBMS control module 840 may send the received unicast signal to the LTE modem 810.

The tunnel manager 844 manages tunneling multicast packets associated with eMBMS data to unicast packets that are to be delivered over LAN to end nodes. The tunnel manager 844 handles tunnel-related parameters (UDP port, an IP address for each end node, etc.), and communicates the parameters to the eMBMS tunneling module 832. The eMBMS tunneling module 832 transmits (e.g., to an end node) unicast packets associated with the eMBMS data based on the parameters received from the tunnel manager 844. The eMBMS control handler 846 manages communication between the eMBMS control module 840 and the LTE modem 810 or any other modules.

Figure 9:
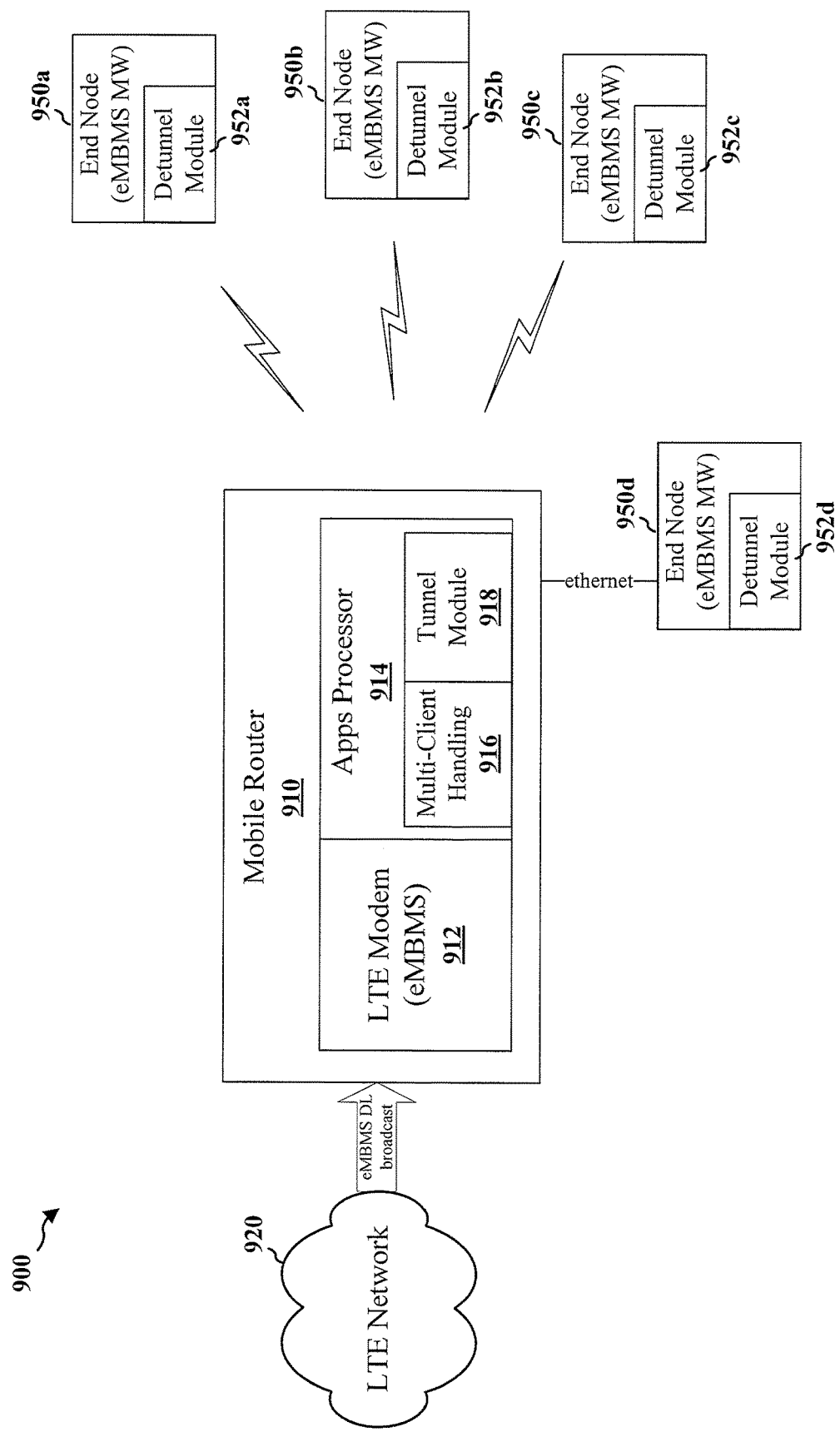
FIG. 9 is an example diagram illustrating the first aspect of the disclosure.

According to a first aspect of the disclosure, the network device is a mobile router that communicates the eMBMS data to one or more end nodes, without an intermediary device between the mobile router and the end nodes. FIG. 9 is an example diagram 900 illustrating the first aspect of the disclosure. According to FIG. 9, a mobile router 910 is a network device that receives multicast eMBMS data from a network and subsequently provides unicast eMBMS data to end nodes. The mobile router 910 includes an LTE modem 912 to communicate with an LTE network 920. The mobile router 910 also includes an applications processor 914 including a multi-client handling module 916 and a tunnel module 918. The multi-client handling module 916 and the tunnel module 918 may be equivalent to the multi-client handler 842 and the eMBMS tunneling module 832 of FIG. 8, respectively. End nodes 950a-950c are connected to the mobile router 910 over a wireless LAN (WLAN), and an end node 950d is connected to the mobile router 910 over a LAN via an Ethernet connection.

The mobile router 910 receives eMBMS data from an LTE network 920. The eMBMS data is sent from the LTE network 920 to the mobile router 910 in multicast packets. The mobile router 910 sends the eMBMS data on the unicast tunnel over LAN (e.g., via wireless LAN (WLAN) or an Ethernet connection) to end nodes 950a-950d. In particular, the mobile router 910 may generate unicast packets based on the eMBMS data received from the LTE network 920, and may send the unicast packets to the end nodes 950a-950d on the unicast tunnel.

Each of the end nodes 950a-950d has its own middleware to process the eMBMS data received from the mobile router 910. Further, the end nodes 950a-950d have respective detunnel modules 952a-952d. Each of the detunnel modules 952a-952d is configured to retrieve the eMBMS data from the unicast packets received over the unicast tunnel.

The first aspect of the disclosure provides features such as multi-client handling and tunneling. Each of the end nodes (e.g., end nodes 950a-950d) includes its own middleware that is used to request eMBMS data. The multi-client handling module 916 of the mobile router 910 establishes respective unicast tunneling with middleware of each of the end nodes to send eMBMS data. That is, each middleware of each end node receives eMBMS data via its own unicast tunneling from the mobile router 910. Thus, unicast tunneling between the mobile router 910 and middleware of one end node may be different from unicast tunneling between the mobile router 910 and middleware of another end node. The multi-client handling module 916 collects middleware information from each end node's middleware and maintains information for each middleware. In particular, the multi-client handling module 916 maps each end node with middleware information, eMBMS-related information, etc.

In an aspect, the multi-client handling module 916 may maintain the mapping based on a LAN-eMBMS service mapping table. The LAN-eMBMS service mapping table is maintained and updated for all end nodes connected to the mobile router 910. Table 1 is an example LAN-eMBMS service mapping table that maps each client with an end node IP address, a tunnel UDP port, an eMBMS service enablement indication, TMGI information, a multicast IP address, a multicast UDP port and a control transmission control protocol (TCP) port. A tunnel UDP port is a port on which the end node will be listening for the tunneled unicast packets. The eMBMS service enablement indication includes an indication of eMBMS enablement. The TMGI information includes a TMGI session associated with the eMBMS service that the end node is requesting to activate. It is noted that a TMGI indicates a corresponding eMBMS service. The multicast IP address is an IP address associated with the requested TMGI session. The multicast UDP port is a port for the requested TMGI session in the tunnel. The control TCP port is a port for control packets over a TCP/IP session.

TABLE 1

| LAN-eMBMS service mapping table | | | | | | | |
|---|---|---|---|---|---|---|---|
| End Node 1 | End Node IP address | Tunnel UDP Port | eMBMS Service Enablement | TMGI | Multicast IP address | Multicast UDP Port | Control TCP Port |
| End | End Node | Tunnel | eMBMS | TMGI | Multicast | Multicast | Control |

TABLE 1-continued

LAN-eMBMS service mapping table

| | | | | | | | |
|---|---|---|---|---|---|---|---|
| Node 2 | IP address | UDP Port | Service Enablement | | IP address | UDP Port | TCP Port |
| End Node 3 | End Node IP address | Tunnel UDP Port | eMBMS Service Enablement | TMGI | Multicast IP address | Multicast UDP Port | TCP Control Port |

In one aspect, arbitration of requests for eMBMS data from multiple end nodes may be desired when the multiple end nodes attempt to receive the same eMBMS service. In general, if a first end node (Node A) determines to receive a first eMBMS service, the first end node (e.g., middleware of the first end node) sends the mobile router 910 a request to activate a TMGI for the first eMBMS service, such that the applications processor 914 of the mobile router 910 may request the LTE Modem 912 to activate the TMGI. In one example, if a first end node (Node A) is currently receiving a first eMBMS service and a second end node (Node B) requests the first eMBMS service, the mobile router 910 may perform arbitration for efficient streaming of the eMBMS data. In such an example, if the Node B connects to the mobile router 910 and requests the first eMBMS service by sending the mobile router 910 a request to activate a TMGI for the first eMBMS service, the applications processor 914 of the mobile router 910 does not need to request the LTE modem 912 to activate the TMGI for the first eMBMS service because the TMGI for first eMBMS service was already activated, as indicated by the Node A receiving the first eMBMS service. Thus, in such an example, without requesting the LTE modem 912 for the TMGI activation for the first eMBMS service, the tunnel module 918 of the applications processor 914 starts forwarding the TMGI for the first eMBMS service to the Node B, such that the Node B may receive the first eMBMS service. In another aspect, if there are multiple end nodes receiving the first eMBMS service, arbitration may be performed such that the TMGI for the first eMBMS service is not deactivated until all of the multiple end nodes receiving the first eMBMS service deactivate the TMGI for the first eMBMS service (e.g., thus stop receiving the first eMBMS service). For example, if the Node A and the Node B are initially receiving the first eMBMS service, and the Node B deactivates the first eMBMS service associated with the TMGI, the mobile router 910 does not deactivate the TMGI for the first eMBMS service because the first node is still receiving the first eMBMS service associated with the TMGI. If the Node A is the only end node receiving the first eMBMS service initially, and then the Node A deactivates the first eMBMS service associated with the TMGI, the mobile router 910 deactivates the TMGI for the first eMBMS service.

The multi-client handling module 916 may map a TMGI session with a reference count to indicate a number of end nodes utilizing the TMGI session. The multi-client handling module may provide such mapping in a TMGI reference count table, as shown in Table 2, for example. According to Table 2, there are three TMGIs (TMGI1, TMGI2, and TMGI3). For TMGI 1, the reference count is 2, and thus two end nodes receive eMBMS data associated with TMGI1. The reference count for TMGI2 is 3, and thus three end nodes receive eMBMS data associated with TMGI2. The reference count for TMGI3 is 1, and thus one end node receives eMBMS data associated with TMGI 3.

TABLE 2

TMGI reference count table

| TMGI | Reference Count |
|---|---|
| TMGI1 | 2 |
| TMGI2 | 3 |
| TMGI3 | 1 |

Based on the TMGI reference count table, the multi-client handling module 916 may determine whether a specific TMGI was already activated (e.g., by the LTE modem 912) while handling a TMGI activation request from a different end node. Thus, the arbitration of requests for eMBMS data from multiple end nodes may be performed by maintaining the TMGI reference count table, as discussed infra. Several scenarios for maintaining the TMGI reference count table is described more in detail below.

In one scenario, more than one end nodes may request the mobile router 910 for activation of the same TMGI session. When the mobile router 910 receives a request for activation of the TMGI session from an end node, the multi-client handling module 916 determines whether the requested TMGI session is yet activated. If the requested TMGI session is not already activated, the mobile router 910 activates the requested TMGI. If the requested TMGI session is already activated, the mobile router 910 does not need to activate the requested TMGI.

In such a scenario, the multi-client handling module 916 may check the TMGI reference count table to determine whether the requested TMGI session is already activated and thus is placed in the TMGI reference count table. If the requested TMGI session is not in the TMGI reference count table, then the requested TMGI session is not yet activated, and thus the mobile router 910 activates the requested TMGI. Therefore, if the requested TMGI session is not in the TMGI reference count table, the multi-client handling module creates an entry for the TMGI session in the TMGI reference count table, and increases a reference count associated with the TMGI session in the TMGI reference count table. If the requested TMGI session is already in the TMGI reference count table, then the requested TMGI session is already activated, and thus does not need to be activated. For example, if a second end node already requested the same TMGI session, then an entry for the TMGI session would exist on the TMGI reference count table, with the reference count reflecting the second node. Thus, if the requested TMGI session already exists in the TMGI reference count table, the multi-client handling module increases a TMGI reference count associated with the requested TMGI session, without creating a new entry for the requested TMGI session. Further, for the requesting end node, the multi-client handling module 916 may create an entry for the TMGI session, and associate the requesting end node with the TMGI session in the LAN-eMBMS service mapping table. After updating the TMGI reference count table and/or the LAN-eMBMS service mapping table, the multi-client handling module sends a success response to the end node, and signals the tunnel module 918 to forward the eMBMS data associated with the requested TMGI session to the requesting end node via a unicast tunnel.

In another scenario, an end node may request the mobile router 910 to deactivate a TMGI session. In one example, multiple end nodes may request the mobile router to deactivate the same TMGI session. When the mobile router receives 910 a request to deactivate a TMGI session, the multi-client handling module 916 clears the entry for the corresponding TMGI session in the LAN-eMBMS service mapping table, and may also clear eMBMS-related information associated with the corresponding TMGI session in the LAN-eMBMS service mapping table. In such a scenario, the multi-client handling module 916 also reduces the reference count associated with the corresponding TMGI session in the TMGI reference count table. For example, if there are two end nodes requesting to deactivate the TMGI session, then the multi-client handling module reduces the reference count associated with the TMGI session by two. In the example of Table 2, if there are two end nodes requesting to deactivate TMGI2, then the reference count 3 for TMGI2 is reduced to 1. If reducing the reference count for the corresponding TMGI session causes the reference count to become zero, then the multi-client handling module 916 removes the entry for the corresponding TMGI session from the TMGI reference count table and deactivates the TMGI session. If reducing the reference count for the corresponding TMGI session causes the reference count to become zero for the TMGI session, the multi-client handling module 916 may clear eMBMS-related information associated with all of the TMGI sessions for the end node in the LAN-eMBMS service mapping table.

In another scenario, an end node may disconnect from the mobile router 910. When the end node is disconnected from the mobile router 910, the multi-client handling module 916 removes all entries associated with the end node in the LAN-eMBMS service mapping table. In such a scenario, the multi-client handling module 916 also reduces the reference count for all the TMGI sessions associated with the corresponding end node in the TMGI reference count table. For example, based on the example of Table 2, if an end node receiving eMBMS data associated with TMGI1 and TMGI2 disconnects from the mobile router 910, then the reference count for TMGI1 is reduced from 2 to 1 and the reference count for TMGI2 is reduced from 3 to 2. If reducing the reference count for a TMGI session causes the reference count to become zero, then the multi-client handling module 916 removes the entry for that TMGI session from the TMGI reference count table and deactivates that TMGI session. If reducing the reference count for the corresponding TMGI session causes the reference count to become zero for the TMGI session, the multi-client handling module 916 may clear eMBMS-related information associated with all of the TMGI sessions for the end node in the LAN-eMBMS service mapping table.

In another scenario, an end node may send a message to the mobile router 910 to disable an eMBMS service. In such a scenario, upon receiving the eMBMS service disable message, the multi-client handling module 916 clears eMBMS-related information associated with all of the TMGI sessions for the end node in the LAN-eMBMS service mapping table. The multi-client handling module 916 also reduces the reference count associated with all the TMGI sessions for the end node in the TMGI reference count table. For example, based on the example of Table 2, if an end node receiving eMBMS data associated with TMGI1 and TMGI2 sends a message to disable the eMBMS service to the mobile router 910, then the reference count for TMGI1 is reduced from 2 to 1 and the reference count for TMGI2 is reduced from 3 to 2. If reducing the reference count for a TMGI session causes the reference count to become zero, then the multi-client handling module 916 removes the entry for that TMGI session from the TMGI reference count table and deactivates that TMGI session.

The mobile router 910 may deliver unicast packets including eMBMS data via a unicast tunnel to eMBMS middleware of an end node via a LAN. The end nodes connected to the mobile router 910 over the LAN may be in the same subnet as the mobile router 910. The tunnel module 918 of the mobile router 910 encapsulates eMBMS multicast packets of eMBMS data in a unicast IP tunnel to the end node requesting the eMBMS service. The mobile router 910 encapsulates eMBMS multicast packets by attaching a unicast IP header and a UDP header to a raw multicast IP packet, where the raw multicast IP packet is the multicast IP packet of the eMBMS data that the mobile router received from the network. The resulting packet after attaching a unicast IP header and a UDP header to a raw multicast IP packet may have the following format: |Unicast IP Header-|UDP Header|Raw Multicast IP Packet|. The resulting packet is treated as a unicast packet due to the unicast IP header and the UDP header, and thus is sent to the end node via unicast transmission. When the end node receives the resulting unicast packet, the detunnel module of the end node decapsulates the received unicast packet to retrieve the raw multicast IP packet of the eMBMS data from the unicast packet, and subsequently forwards the raw multicast IP packet a networking protocol stack of the end node to process the raw multicast IP packet.

For the communication of the unicast packet via a unicast tunnel to the end node, a single tunnel is established per end node through which all TMGI sessions are tunneled. For example, the end node may be connected for multiple TMGI sessions (thus different types of eMBMS service), and a single unicast tunnel is established for all of the multiple TMGI sessions for the corresponding end node such that all of the multiple TMGI sessions may be tunneled through the single unicast tunnel.

In an aspect, if the mobile router 910 determines that a requesting end node and one or more end nodes are requesting the same eMBMS data, the mobile router 910 may replicate the resulting unicast packet to generate unicast packets for the other end nodes. The mobile router 910 may replicate the resulting unicast packet by encapsulating the raw multicast IP packet with the unicast IP header and the UDP header. For example, if end node 950a requests eMBMS data of TMGI1, and end nodes 950b and 950c also request the eMBMS data of TMGI1, then the mobile router 910 generates a unicast packet for the end node 950a, and further replicates two unicast packet for the end nodes 950b and 950c, respectively, where the replicated unicast packets are the same as the unicast packet for the end node 950a.

It is noted that the mobile router 910 reserves a TCP port for control packets over a TCP/IP session. For example, a TCP port 5006 may be used as the TCP port for communicating the control packets. It is also noted that, when the end node becomes disconnected from the mobile router 910, the disconnection is detected by a combination of events generated by LAN host drivers, kernel generated netlink events and TCP control connection teardown. Thus, the mobile router 910 is capable of detecting the disconnection of an end node, and upon detection of the disconnection, the mobile router 910 may update the mapping tables and eMBMS-related information. It is also noted that close communication between the tunnel module 918 and the multi-client handling module 916 is useful to continuously update the tunneling and successfully forward the eMBMS data to interested end nodes.

Figure 10:
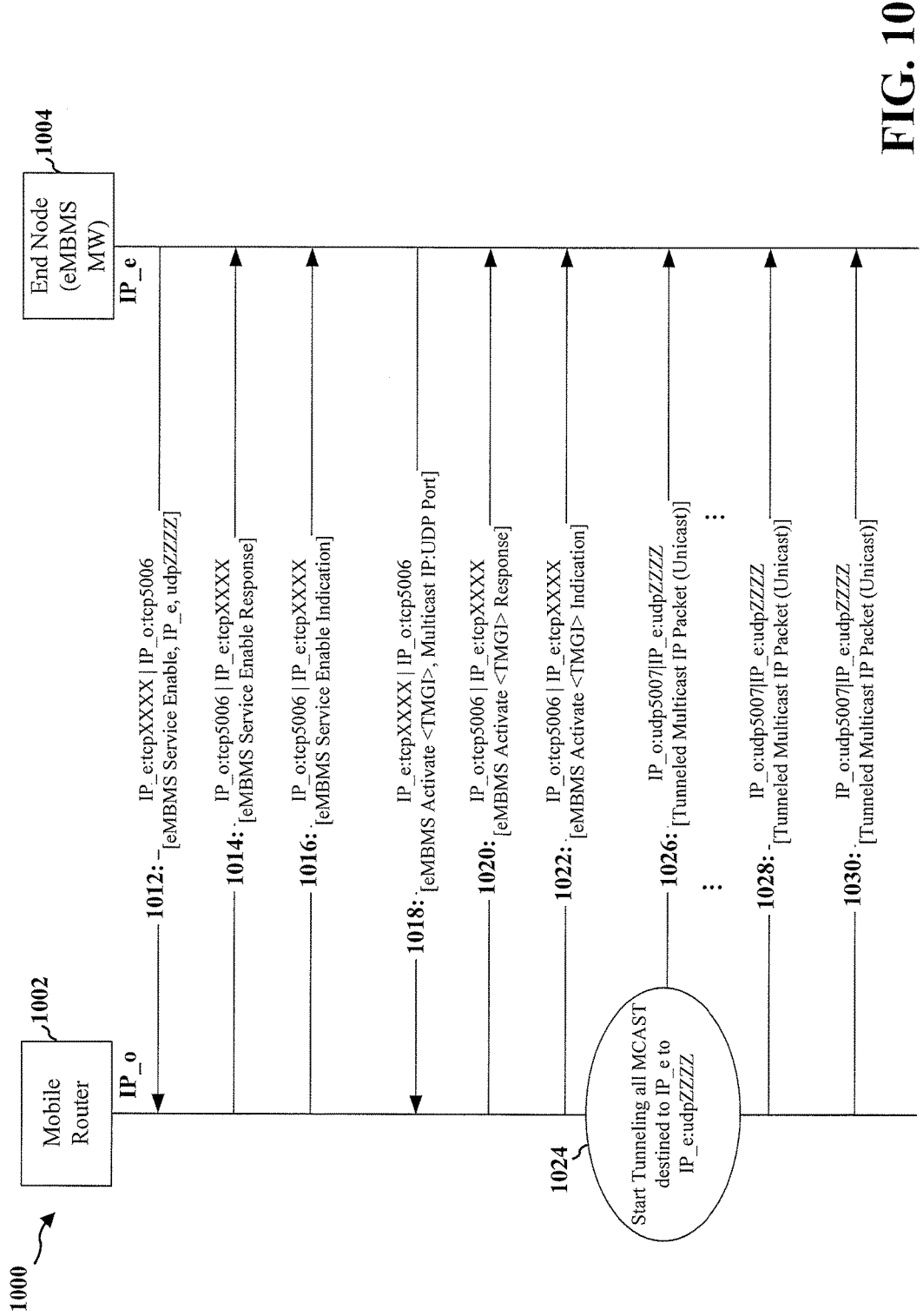
FIG. 10 is an example call flow diagram illustrating a call flow according to the first aspect of the disclosure.

FIG. 10 is an example call flow diagram 1000 illustrating a call flow according to the first aspect of the disclosure. A mobile router 1002 may correspond with the mobile router 910 of FIG. 9, and an end node 1004 with middleware may correspond with one of the end nodes 950a-950d of FIG. 9. For the example call flow diagram 1000, the following parameters in Table 3 are utilized.

TABLE 3

Parameters for an example call flow diagram for the first aspect

| Parameters | Parameter details |
|---|---|
| IP_e | end node IP address |
| IP_o | Mobile Router IP address towards the end node |
| IP_e:tcpXXXX \| IP_o:tcp5006 | IP packet with a source address IP_e, a source TCP port XXXX, a destination address IP_o, a destination TCP port 5006 |
| IP_o:tcp5006 \| IP_e:tcpXXXX | IP packet with a source address IP_o, a source TCP port 5006, a destination address IP_e, a destination TCP port XXXX |
| IP_o:udp5007 \| IP_e:udpZZZZ | IP packet with a source address IP_o, a source UDP port 5007, a destination address IP_e, a destination UDP port ZZZZ |

At 1012, the end node 1004 sends an eMBMS service enable request to the mobile router 1002. At 1012, the end node 1004 may also send an end node IP address (e.g., IP_e) and a corresponding UDP port number (e.g., udpZZZZ). In response, at 1014, the mobile router 1002 sends a response to the end node 1004 to acknowledge that the mobile router 1002 received the eMBMS service enable request. When the mobile router 1002 enables the eMBMS, at 1016, the mobile router 1002 sends the eMBMS service enable indication to indicate that the eMBMS service is enabled. At 1018, the end node 1004 sends a TMGI activation request (eMBMS Activate <TMGI>) to the mobile router 1002 specifying a TMGI session to be activated. At 1018, the end node 1004 may also send a multicast IP address and a multicast UDP port number (Multicast IP:UDP port). In response, at 1020, the mobile router 1002 sends a response to the end node 1004 to acknowledge that the mobile router received the TMGI activation request. When the mobile router 1002 activates the TMGI session according to the TMGI activation request, at 1022, the mobile router 1002 sends a TMGI activation indication to the end node 1004 in order to indicate the TMGI activation. Once the TMGI session has been activated, at 1024, the tunneling module of the mobile router 1002 starts tunneling eMBMS multicast packets by encapsulating a raw multicast IP packet with a unicast header and a UDP header, and forwards the resulting unicast packet to the end node 1004, at 1026, 1028, and 1030. It is noted that, at 1024, the encapsulated multicast IP packets are tunneled to an IP address of the end node 1004 (e.g., IP_e) and its corresponding UDP port (e.g., udpZZZZ).

Figure 11:
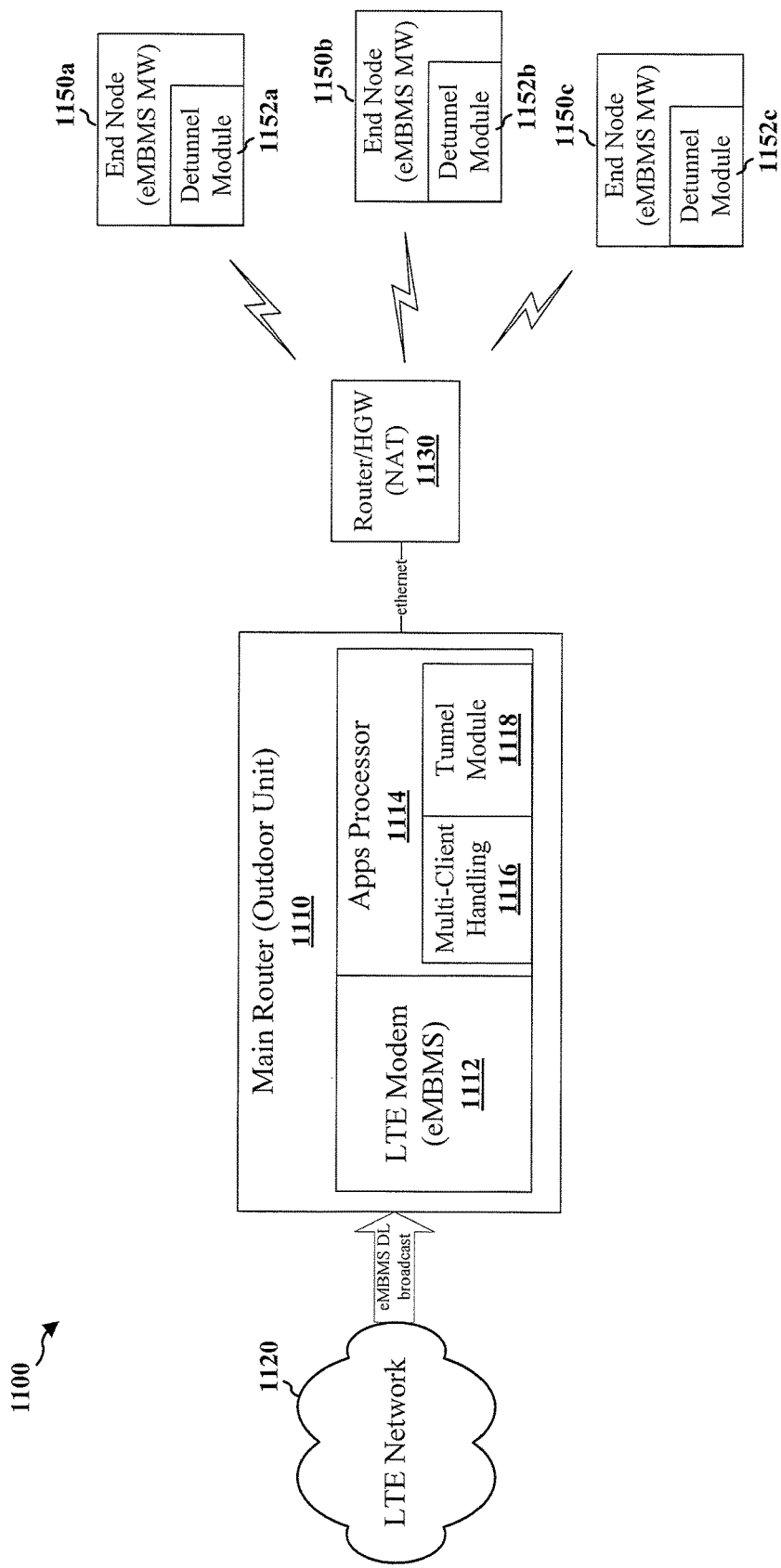
FIG. 11 is an example diagram illustrating the second aspect of the disclosure.

According to a second aspect of the disclosure, the network device is a main router such as an outdoor unit (ODU) that is connected to a router/home gateway (HGW), and the router/HGW communicates the eMBMS data to one or more end nodes. FIG. 11 is an example diagram 1100 illustrating the second aspect of the disclosure. According to FIG. 11, a main router (outdoor unit) 1110 is a network device that receives multicast eMBMS data from a network and subsequently provides unicast eMBMS data to a router/HGW 1130. The main router 1110 may be a mobile router, instead of an outdoor unit. The router/HGW 1130 provides the unicast eMBMS to end nodes 1150a-1150c. The router/HGW 1130 has a NAT module, and thus translates from private IP addresses for respective end nodes 1150a-1150c to a public IP address at the router/HGW 1130. In particular, the NAT module may translate from a private IP address and a corresponding port number of the private IP address at an end node to a public IP address and a corresponding port number of the public IP address at the router/HGW 1130. It is noted that the public IP address at the router/HGW 1130 is assigned by the main router 1110. The main router 1110 includes an LTE modem 1112 to communicate with an LTE network 1120. The main router 1110 also includes an applications processor 1114 including a multi-client handling module 1116 and a tunnel module 1118. The multi-client handling module 1116 and the tunnel module 1118 may be equivalent to the multi-client handler 842 and the eMBMS tunneling module 832 of FIG. 8, respectively. The main router 1110 is connected to the router/HGW 1130 over a LAN (e.g., via an Ethernet connection or a WLAN). The end nodes 1150a-1150c are connected to the router/HGW 1130 over a LAN such as a WLAN.

The main router 1110 receives eMBMS data from an LTE network 1120, where the eMBMS data is in multicast packets. The main router 1110 sends the eMBMS data on the unicast tunnel over LAN to end nodes 1150a-1150c via the router/HGW 1130. In particular, the main router 1110 may generate unicast packets based on the eMBMS data, and may send the unicast packets to the router/HGW 1130. Subsequently, the router/HGW 1130 forwards the unicast packets to the end nodes 1150a-1150c on the unicast tunnel.

Each of the end nodes 1150a-1150c has its own middleware to process the eMBMS data received from the router/HGW 1130. Further, the end nodes 1150a-1150c have respective detunnel modules 1152a-1152c. Each of the detunnel modules 1152a-1152c is configured to retrieve the eMBMS data from the unicast packets, where the unicast packets are received from the router/HGW 1130 over the unicast tunnel.

The second aspect of the disclosure provides features such as multi-client handling and tunneling. Each of the end nodes (e.g., end nodes 1150a-1150c) includes its own middleware that is used to request eMBMS data. The multi-client handling module 1116 of the main router 1110 establishes respective unicast tunneling with middleware of each of the end nodes 1150a-1150c via the router/HGW 1130 in order to send eMBMS data. The multi-client handling module 1116 collects middleware information from each end node's middleware and maintains information for each middleware. In particular, the multi-client handling module 1116 maps each end node with middleware information, eMBMS-related information, etc.

In an aspect, the multi-client handling module 1116 may maintain the mapping based on a LAN-eMBMS service mapping table. The LAN-eMBMS service mapping table is maintained and updated for all end nodes connected to the main router 1110. Table 4 is an example LAN-eMBMS service mapping table that maps each client with an end node IP address, an end node NATed IP address, a tunnel UDP port, an eMBMS service enablement indication, TMGI information, a multicast IP address, a multicast UDP port and a control TCP port. A tunnel UDP port is a UDP port a port on which the end node will be listening for the tunneled unicast packets. The eMBMS service enablement indication includes an indication of eMBMS enablement. The TMGI information includes a TMGI session associated with the eMBMS service that the end node is requesting to activate. It is noted that a TMGI indicates a corresponding eMBMS service. The multicast IP address is an IP address associated with the requested TMGI session. The multicast UDP port is a port for the requested TMGI session in the tunnel. The control TCP port is a port for control packets over a TCP/IP session. The end node NATed IP address is a public IP address that is translated from the end node IP address by the NAT module of the router/HGW 1130.

TABLE 4

| | | | | LAN-eMBMS service mapping table | | | | |
|---|---|---|---|---|---|---|---|---|
| End Node 1 | End Node IP address | End Node NATed IP address | Tunnel UDP Port | eMBMS Service Enablement | TMGI | Multicast IP address | Multicast UDP Port | Control TCP Port |
| End Node 2 | End Node IP address | End Node NATed IP address | Tunnel UDP Port | eMBMS Service Enablement | TMGI | Multicast IP address | Multicast UDP Port | Control TCP Port |
| End Node 3 | End Node IP address | End Node NATed IP address | Tunnel UDP Port | eMBMS Service Enablement | TMGI | Multicast IP address | Multicast UDP Port | Control TCP Port |

In one aspect, arbitration of requests for eMBMS data from multiple end nodes may be desired when the multiple end nodes attempt to receive the same eMBMS service. In general, if a first end node (Node A) determines to receive a first eMBMS service, the first end node (e.g., middleware of the first end node) sends the main router 1110 a request to activate a TMGI for the first eMBMS service, via the router/HGW 1130, such that the applications processor 1114 of the main router 1110 may request the LTE Modem 1112 to activate the TMGI. In one example, if a first end node (Node A) is currently receiving a first eMBMS service and a second end node (Node B) requests the first eMBMS service, the main router 1110 may perform arbitration for efficient streaming of the eMBMS data. In such an example, if the Node B connects to the main router 1110 via the router/HGW 1130 and requests the first eMBMS service by sending the main router 1110 a request to activate a TMGI for the first eMBMS service, the applications processor 1114 of the main router 1110 does not need to request the LTE modem 1112 to activate the TMGI for the first eMBMS service because the TMGI for first eMBMS service was already activated, as indicated by the Node A receiving the first eMBMS service. Thus, in such an example, without requesting the LTE modem 1112 for the TMGI activation for the first eMBMS service, the tunnel module 1118 of the applications processor 1114 starts forwarding the TMGI for the first eMBMS service to the Node B, via the router/HGW 1130, such that the Node B may receive the first eMBMS service. In another aspect, if there are multiple end nodes receiving the first eMBMS service, arbitration may be performed such that the TMGI for the first eMBMS service is not deactivated until all of the multiple end nodes receiving the first eMBMS service deactivate the TMGI for the first eMBMS service (e.g., thus stop receiving the first eMBMS service). For example, if the Node A and the Node B are initially receiving the first eMBMS service, and the Node B deactivates receiving the first eMBMS service associated with the TMGI, the main router 1110 does not deactivate the TMGI for the first eMBMS service because the first node is still receiving the first eMBMS service associated with the TMGI. If the Node A is the only end node receiving the first eMBMS service initially, and then the Node A deactivates the first eMBMS service associated with the TMGI, the main router 1110 deactivates the TMGI for the first eMBMS service.

The multi-client handling module 1116 may map a TMGI session with a reference count to indicate a number of end nodes utilizing the TMGI session. The multi-client handling module may provide such mapping in a TMGI reference count table, as shown in Table 5, for example. According to Table 5, there are three TMGIs (TMGI1, TMGI2, and TMGI3). For TMGI1, the reference count is 2, and thus two end nodes receive eMBMS data associated with TMGI1. The reference count for TMGI2 is 3, and thus three end nodes receive eMBMS data associated with TMGI2. The reference count for TMGI3 is 1, and thus one end node receives eMBMS data associated with TMGI 3.

TABLE 5

| TMGI reference count table | |
|---|---|
| TMGI | Reference Count |
| TMGI1 | 2 |
| TMGI2 | 3 |
| TMGI3 | 1 |

Based on the TMGI reference count table, the multi-client handling module 1116 may determine whether a specific TMGI was already activated (e.g., by the LTE modem 1112) while handling a TMGI activation request from a different end node. The arbitration of requests for eMBMS data from multiple end nodes may be performed by maintaining the TMGI reference count table, as discussed infra. Several scenarios for maintaining the TMGI reference count table is described more in detail below.

In one scenario, more than one end nodes may request the main router 1110 for activation of the same TMGI session, via the router/HGW 1130. When the main router 1110 receives a request for activation of the TMGI session from an end node, the multi-client handling module 1116 checks the TMGI reference count table to determine whether the requested TMGI session is already activated, and thus is placed in the TMGI reference count table. If the requested TMGI session is not in the TMGI reference count table, then the requested TMGI session is not yet activated, and thus the main router 1110 activates the requested TMGI. Therefore, if the requested TMGI session is not in the TMGI reference count table, the multi-client handling module creates an entry for the TMGI session in the TMGI reference count table, and increases a reference count associated with the TMGI session in the TMGI reference count table. If the requested TMGI session is already in the TMGI reference count table, then the requested TMGI session is already activated, and thus does not need to be activated. For example, if a second end node already requested the same TMGI session, then an entry for the TMGI session would exist on the TMGI reference count table, with the reference count reflecting the second node. Thus, if the requested TMGI session is already in the TMGI reference count table, the multi-client handling module increases a TMGI reference count associated with the TMGI session, without creating a new entry. Further, for the requesting end node, the multi-client handling module 1116 may create an entry for the TMGI session, and associate the requesting end node with the TMGI session in the LAN-eMBMS service mapping table. After updating the TMGI reference count table and/or the LAN-eMBMS service mapping table, the multi-client handling module sends a success response to the end node, and signals the tunnel module 1118 to forward the eMBMS data associated with the requested TMGI session to the requesting end node via a unicast tunnel.

In another scenario, an end node may request the main router 1110 to deactivate a TMGI session, via the router/HGW 1130. In one example, multiple end nodes may request the mobile router to deactivate the same TMGI session. When the main router receives 1110 a request to deactivate a TMGI session, the multi-client handling module 1116 clears the entry for the corresponding TMGI session in the LAN-eMBMS service mapping table, and may also clear eMBMS-related information associated with the corresponding TMGI session in the LAN-eMBMS service mapping table. In such a scenario, the multi-client handling module 1116 also reduces the reference count associated with the corresponding TMGI session in the TMGI reference count table. For example, if there are two end nodes requesting to deactivate the TMGI session, then the multi-client handling module reduces the reference count associated with the TMGI session by two. In the example of Table 5, if there are two end nodes requesting to deactivate the TMGI2, then the reference count 3 is reduced to 1. If reducing the reference count for the corresponding TMGI session causes the reference count to become zero, then the multi-client handling module 1116 removes the entry for the corresponding TMGI session from the TMGI reference count table and deactivates the TMGI session. If reducing the reference count for the corresponding TMGI session causes the reference count to become zero for the TMGI session, the multi-client handling module 1116 may clear eMBMS-related information associated with all of the TMGI sessions for the end node in the LAN-eMBMS service mapping table.

In another scenario, an end node may disconnect from the main router 1110. When the end node is disconnected from the main router 1110, the multi-client handling module 1116 removes all entries associated with the end node in the LAN-eMBMS service mapping table. In such a scenario, the multi-client handling module 1116 also reduces the reference count for all the TMGI sessions associated with the corresponding end node in the TMGI reference count table. For example, based on the example of Table 5, if an end node receiving eMBMS data associated with TMGI1 and TMGI2 disconnects from the main router 1110, then the reference count for TMGI1 is reduced from 2 to 1 and the reference count for TMGI2 is reduced from 3 to 2. If reducing the reference count for a TMGI session causes the reference count to become zero, then the multi-client handling module 1116 removes the entry for that TMGI session from the TMGI reference count table and deactivates that TMGI session. If reducing the reference count for a TMGI session causes the reference count to become zero, then the multi-client handling module 1116 removes the entry for that TMGI session from the TMGI reference count table and deactivates that TMGI session.

In another scenario, an end node may send a message to the main router 1110 via the router/HGW 1130 in order to disable an eMBMS service. In such a scenario, upon receiving the eMBMS service disable message, the multi-client handling module 1116 clears eMBMS-related information associated with all of the TMGI sessions for the end node in the LAN-eMBMS service mapping table. The multi-client handling module 1116 also reduces the reference count associated with all the TMGI sessions for the end node in the TMGI reference count table. For example, based on the example of Table 5, if an end node receiving eMBMS data associated with TMGI1 and TMGI2 sends a message to disable the eMBMS service to the main router 1110, then the reference count for TMGI1 is reduced from 2 to 1 and the reference count for TMGI2 is reduced from 3 to 2. If reducing the reference count for a TMGI session causes the reference count to become zero, then the multi-client handling module 1116 removes the entry for that TMGI session from the TMGI reference count table and deactivates that TMGI session.

The main router 1110 may deliver unicast packets including eMBMS data via a unicast tunnel through the router/HGW 1130 to eMBMS middleware of an end node via a LAN. It is noted that the end nodes connected to the main router 1110 over the LAN may not be in the same subnet as the main router 1110 due to the router/HGW 1130 existing between the main router 1110 and the end nodes. The tunnel module 1118 of the main router 1110 encapsulates eMBMS multicast packets in a unicast IP tunnel to the end node requesting the eMBMS service. The main router 1110 encapsulates eMBMS multicast packets by attaching a unicast IP header and a UDP header to a raw multicast IP packet, where the raw multicast IP packet is the multicast IP packet of the eMBMS data that the mobile router received from the network. The resulting packet after attaching a unicast IP header and a UDP header to a raw multicast IP packet may have the following format: |Unicast IP Header|UDP Header|Raw Multicast IP Packet|. The resulting packet is treated as a unicast packet due to the unicast IP header and the UDP header, and thus is sent to the end node via unicast transmission. When the end node receives the resulting unicast packet, the detunnel module of the end node decapsulates the received unicast packet to retrieve the raw multicast IP packet of the eMBMS data from the unicast packet, and subsequently forwards the raw multicast IP packet a networking protocol stack of the end node to process the raw multicast IP packet.

In order to tunnel the multicast packets through the NAT module in the router/HGW 1130 to the end node, the middleware of the end node is configured to open a port in the firewall at the router/HGW 1130. The main router 1110 then may discover the port opened by the middleware of the end node, and utilize the opened port as a tunnel end point. More details on opening the port are provided below.

It is noted that the main router 1110 reserves a TCP port for control packets over a TCP/IP session. For example, a TCP port 5006 may be used as the TCP port for communicating control packets. The main router 1110 also reserves a UDP port to listen for firewall port open packets (FPOPs). The FPOP is used to open a port in an intermediate node (e.g., the router/HGW 1130), such that once a TMGI is activated, the DL multicast traffic can flow through the router/HGW 1130 to the end nodes automatically (without any intervention). In order to maintain the tunnel and the opened port in the router/HGW 1130, the middleware of the end node periodically sends the FPOP to the main router 1110 via the router/HGW 1130. If the main router 1110 does not receive the FPOP periodically, the main router 1110 may determine that the end node for the FPOP is disconnected from the router/HGW 1130 (e.g., thus is disconnected from the main router 1110), and subsequently deactivate the tunnel. Therefore, if the main router 1110 does not receive the FPOP for a predetermined period time (thus misses a predetermined number of consecutive FPOP packets), then the main router 1110 may determine that the end node is disconnected from the router/HGW 1130. The main router 1110 may also determine that the end node is disconnected if there is a TCP control connection teardown.

For the communication of the unicast packet via a unicast tunnel to the end node, a single tunnel is established per end node through which all TMGI sessions are tunneled. For example, the end node may be connected for multiple TMGI sessions (thus different types of eMBMS service), and a single unicast tunnel is established for all of the multiple TMGI sessions for the corresponding end node such that all of the multiple TMGI sessions may be tunneled through the single unicast tunnel.

To start receiving eMBMS data, the middleware of the end node first sends a request for eMBMS service enablement to the main router 1110, for example, by sending control packets to the main router 1110 via the router/HGW 1130. After the middleware of the end node requests eMBMS service enablement to the main router 1110, the main router 1110 enables eMBMS in the LTE modem 1112 of the main router 1110. Upon the eMBMS service enablement, the middleware of the end node starts sending FPOP packets to the main router 1110 at a reserved UDP port number as a destination port for the main router 1110. For example, the reserved UDP port number may be 5007. The middleware of the end node selects a random port number as a source port for the FPOP, such that the eMBMS data may flow through the selected source port for the FPOP. As discussed above, the middleware of the end node periodically sends the FPOP packets to the main router 1110 via the router/HGW 1130, in order to ensure that the NAT module in the router/HGW 1130 keeps the source port for the FPOP open for the eMBMS data traffic. If the FPOP packet is not received at the router/HGW 1130 for a predetermined period of time, the router/HGW 1130 stops keeping the source port for the FPOP open. The predetermined period of time may be set by a user or may be set according to a specification of the router/HGW 1130 and/or the end node. The middleware of the end node places an IP address (e.g., private IP address) of the end node in a payload of the FPOP. When the router/HGW 1130 receives the FPOP, the router/HGW 1130 translates (e.g., via the NAT module) the private IP address of the end node and the source port corresponding to the FPOP for the end node to a public IP address and a port corresponding to the public IP address at the router/HGW 1130, thus opening the port at the router/HGW 1130. Because the port at the router/HGW 1130 is opened, the main router 1110 may tunnel eMBMS data to the end node using the public IP address and the corresponding port at the router/HGW 1130 and the private IP address and the source port of the end node. The main router 1110 may determine whether the end node is still alive (e.g., connected) by detecting the IP address of the end node in the FPOP as the main router 1110 receives the FPOP. When the middleware of the end node selects the source port for the FPOP, the middleware starts listening (immediately) for tunneled packets of the eMBMS data on the selected source port for the FPOP.

When the middleware of the end node sends the FPOP to the main router 1110, the tunnel module 1118 of the main router 1110 receives the FPOP at the reserved UDP port number and performs tunnel maintenance for each active middleware client of each end node. In order to determine the tunnel end point, the tunnel module 1118 obtains the end node IP address from the payload of the FPOP received from the end node. The tunnel end point corresponding to the end node IP address is the same FPOP's source IP address and source port number. The tunnel module 1118 uses a FPOP server port number as a tunnel source port number for all destinations. In particular, the tunnel source port number in the UDP header in the unicast tunnel packets sent from the main router 1110 is the same for all the traffic going to each of the end nodes. As discussed above, if an FPOP is not received for a predetermined time period, the tunnel module 1118 determines that the end node corresponding to the FPOP is disconnected. Thus, if an FPOP is not received for a predetermined time period, the tunnel module 1118 deletes the tunnel end point corresponding to an end node after a predetermined period of time, unless the tunnel end point is refreshed by arrival of an FPOP from the same end node. The tunnel module 1118 determines the tunnel destination for an end node by matching the end node IP address of the end node received in the eMBMS service enablement request from the end node with the IP address received in the payload of the FPOP.

In an aspect, if the main router 1110 determines that a requesting end node and one or more end nodes are requesting the same eMBMS data, the main router 1110 may replicate the resulting unicast packet to generate unicast packets for the other end nodes. The main router 1110 may replicate the resulting unicast packet by encapsulating the raw multicast IP packet with the unicast IP header and the UDP header. For example, if end node 1150a requests eMBMS data of TMGI1, and end nodes 1150b and 1150c also request the eMBMS data of TMGI1, then the main router 1110 generates a unicast packet for the end node 1150a, and further replicates two unicast packet for the end nodes 1150b and 1150c, respectively, where the replicated unicast packets are the same as the unicast packet for the end node 1150a. It is also noted that close communication between the tunnel module 1118 and the multi-client handling module 1116 is useful to continuously update the tunneling and successfully forward the eMBMS data to interested end nodes.

Figure 12:
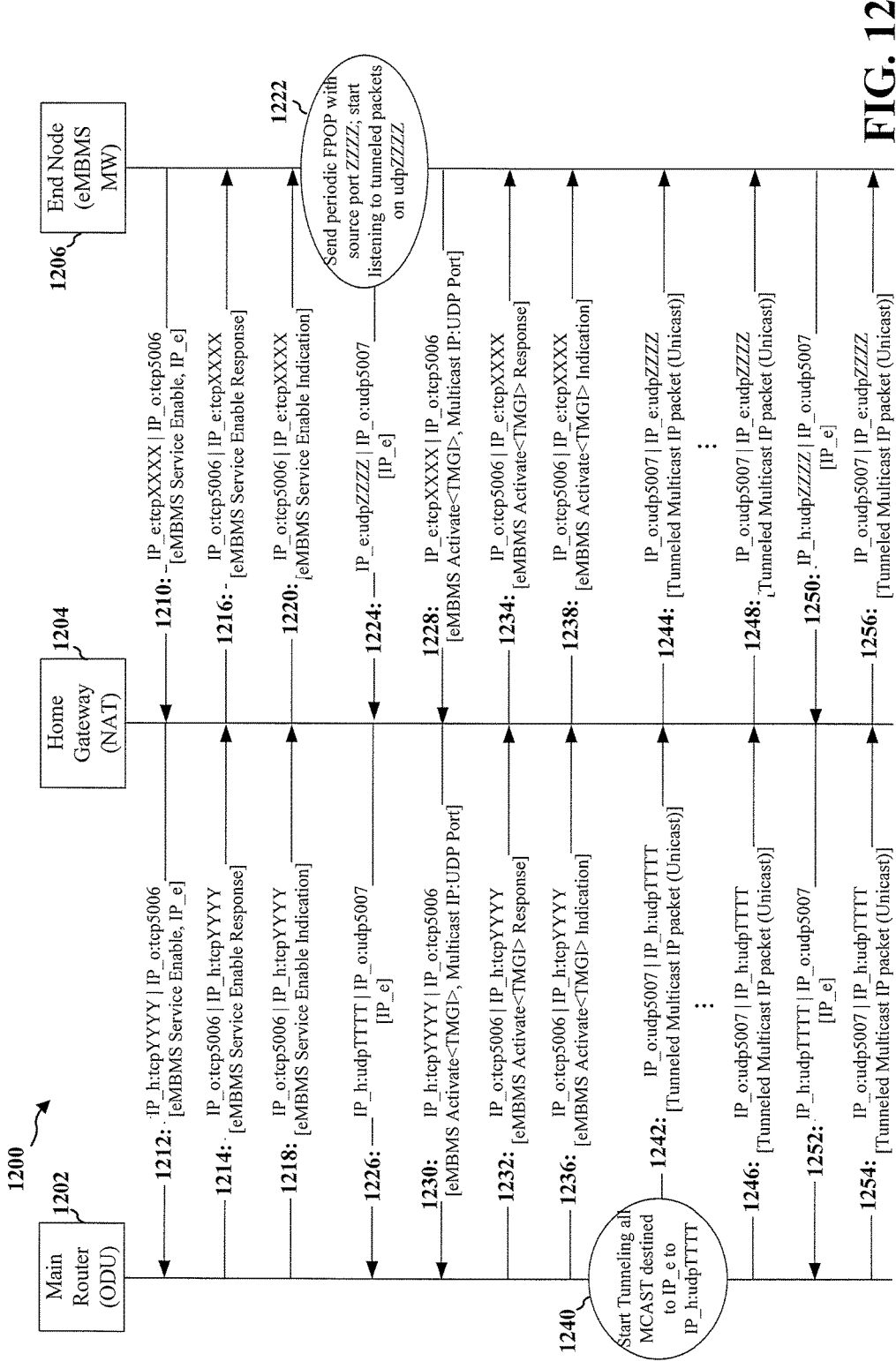
FIG. 12 is an example call flow diagram illustrating a call flow according to the second aspect of the disclosure.

FIG. 12 is an example call flow diagram 1200 illustrating a call flow according to the second aspect of the disclosure. A main router 1202 may correspond with the main router 1110 of FIG. 11, a home gateway 1204 with a NAT module may correspond with router/HGW 1130 of FIG. 11, and an end node 1206 with middleware may correspond with one of the end nodes 1150a-1150c of FIG. 11. For the example call flow diagram 1200, the following parameters in Table 6 are utilized.

TABLE 6

Parameters for an example call flow diagram for the second aspect

| Parameters | Parameter details |
|---|---|
| IP_e | End node IP address |
| IP_e:udpXXXX | IP packet with end node IP address IP_e and UDP port number XXXX |
| IP_h | H-GW IP address toward the Main Router |
| IP_h:udpXXXX | IP packet with HGW/Router IP address IP_h and UDP port number XXXX |
| IP_o | Main Router IP address towards the HGW/end node |
| IP_o:udpXXXX | IP packet with Main Router IP address IP_o and UDP port number XXXX |
| IP_e:udpXXXX|IP_o:udpYYYY | IP packet with a source address IP_e, source UDP port XXXX, destination address IP_o, destination UDP port YYYY |
| IP_e:tcpXXXX|IP_o:tcpYYYY | IP packet with a source address IP_e, source TCP port XXXX, destination address IP_o, destination TCP port YYYY |

At 1210, the end node 1206 sends an eMBMS service enable request to home gateway 1204, and may send an end node IP address (IP_e) to the home gateway 1204. Subsequently, at 1212, the home gateway 1204 forwards the eMBMS service enable request to the main router 1202, and may send the end node IP address to the main router 1202. In response, at 1214, the main router 1202 sends a response to the home gateway 1204 to acknowledge that the main router 1202 received the eMBMS service enable request, and subsequently the home gateway 1204 forwards at 1216 the response to the end node 1206. When the main router 1202 enables the eMBMS, at 1218, the main router 1202 sends the eMBMS service enable indication to the home gateway 1204 to indicate that the eMBMS service is enabled, and subsequently the home gateway 1204 forwards at 1220 the eMBMS service enable indication to the end node 1206.

At 1222, the end node 1206 sends a periodic FPOP with a source port number (ZZZZ), and subsequently starts listening for tunneled packets. Thus, at 1224, the end node 1206 sends the FPOP to the home gateway 1204, which forwards the FPOP to the main router 1202 at 1226, where the FPOP may include the end node IP address. It is noted that, when the home gateway 1204 receives the FPOP at 1224, the home gateway 1204 translates the IP address of the end node 1206 (IP_e) and the source port (udpZZZZ) to a public IP address (IP_h) and its corresponding port (udpTTTT), thus opening the port (udpTTTT) at the home gateway 1204. At 1228, the end node 1206 sends a TMGI activation request (eMBMS Activate <TMGI>) specifying a TMGI session to be activated, to the home gateway 1204, and may send a multicast IP address and a corresponding UDP port number to the home gate way 1204. Subsequently, at 1230, the home gateway 1204 forwards the TMGI activation request to the main router 1202, and may forward the multicast IP address and the corresponding UDP port number to the main router 1202. In response, at 1232, the main router 1202 sends a response to acknowledge that the mobile router received the TMGI activation request, to the home gateway 1204, and the home gateway 1204 at 1234 forwards the response to the end node 1206. When the main router 1202 activates the TMGI session according to the TMGI activation request, at 1236, the main router 1202 sends a TMGI activation indication to the home gateway 1204, which forwards the TMGI activation indication to the end node 1206 at 1238, in order to indicate the TMGI activation. Once the TMGI session has been activated, at 1240, the tunneling module of the main router 1202 starts tunneling eMBMS multicast packets by encapsulating a raw multicast IP packet of eMBMS data with a unicast header and a UDP header. Thus, the main router 1202 forwards the tunneled multicast packet (a unicast packet) to the end node 1206 via 1204, at 1242, 1244, 1246, and 1248. Because the port (udpTTTT) at the home gateway 1204 is opened, the packet received through the port (udpTTTT) at the home gateway 1204 may be tunneled to the source port (udpZZZZ) at the end node 1206. At 1250, the end node 1206 sends a periodic FPOP to the home gateway 1204, which forwards the FPOP to the main router 1202, in order to maintain the tunneling. At 1254, the main router 1202 sends a tunneled multicast packet (a unicast packet) to the home gateway 1204, which forwards the tunneled multicast packet to the end node 1206, via the tunnelling.

Figure 13:
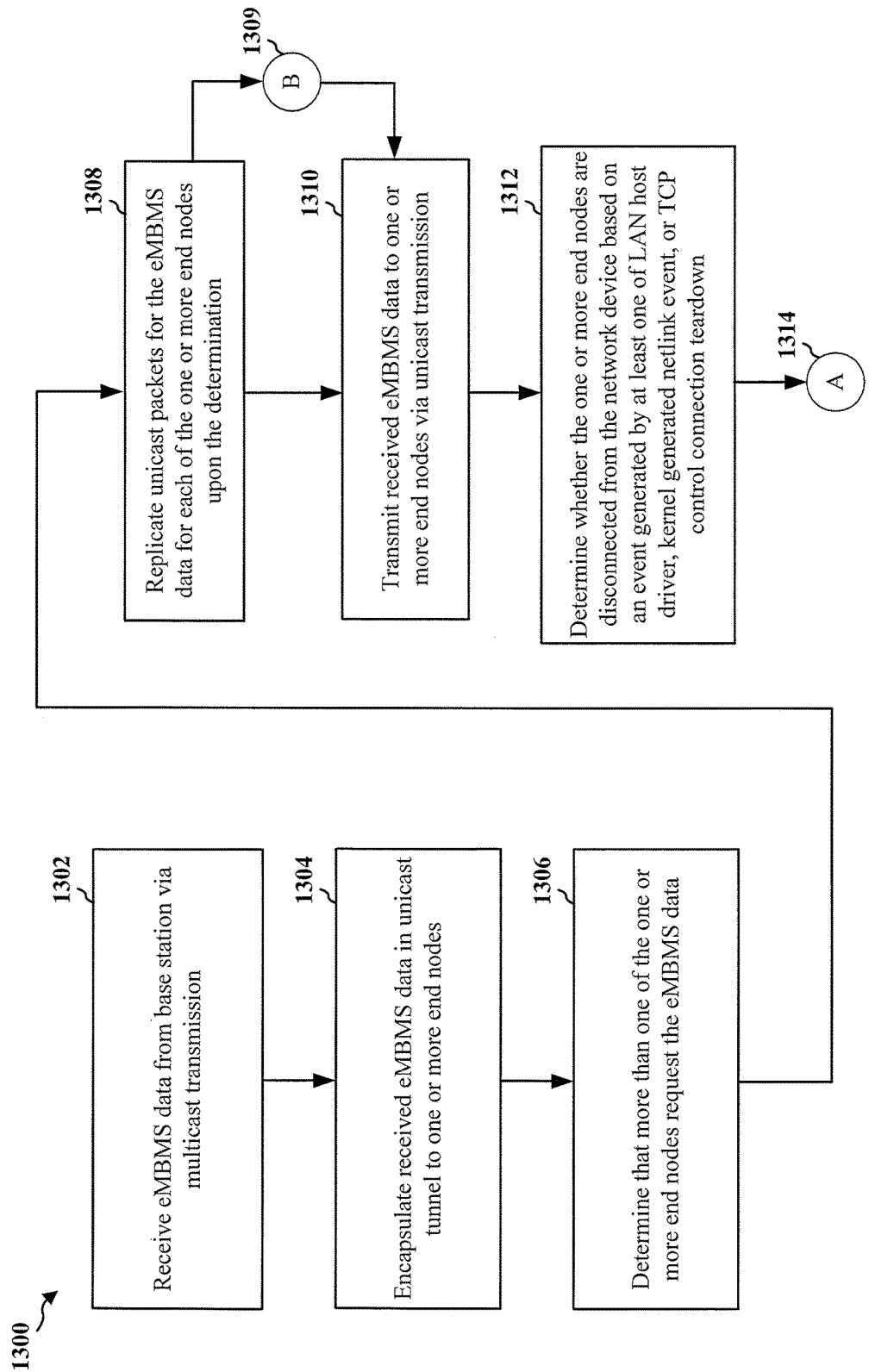
FIG. 13 is a flow chart of a method of wireless communication.

FIG. 13 is a flow chart 1300 of a method of wireless communication. The method may be performed by a network device (e.g., the UE 102, the UE 650, the network device 802, the apparatus 1802/1802') that is connected to an eNB and is also connected to end devices over LAN. At 1302, the network device receives eMBMS data from a base station (e.g., eNB) via multicast transmission. For example, as discussed supra, the mobile router 910 receives eMBMS data from an LTE network 920, where the eMBMS data is in multicast packets. At 1304, the network device encapsulates the received eMBMS data in a unicast tunnel to the one or more end nodes. In an aspect, the encapsulated eMBMS data is transmitted to the one or more end nodes via the unicast transmission. For example, as discussed supra, the tunnel module 918 of the mobile router 910 encapsulates eMBMS multicast packets in a unicast IP tunnel to the end node requesting the eMBMS service. At 1306, the network device determines that more than one of the one or more end nodes request the eMBMS data. At 1308, the network device replicates unicast packets for the eMBMS data for each of the one or more end nodes upon the determination. In an aspect, the replicated unicast packets are sent to each of the one or more end nodes. For example, as discussed supra, if the mobile router 910 determines that a requesting end node and one or more end nodes are requesting the same eMBMS data, the mobile router 910 may replicate the resulting unicast packet to generate unicast packets for the other end nodes. If an intermediary router is used between the network device and the one or more end nodes, the feature B at 1309 may be performed, as discussed in FIG. 17 infra. At 1310, the network device transmits the received eMBMS data to one or more end nodes via unicast transmission, where the one or more end nodes are connected to the network device via a local area network. For example, as discussed supra, the mobile router 910 sends the eMBMS data on the unicast tunnel over LAN (e.g., via WLAN) or an Ethernet connection) to end nodes 950a-950d. In particular, as discussed supra, the mobile router 910 may generate unicast packets based on the eMBMS data, and may send the unicast packets to the end nodes 950a-950d on the unicast tunnel At 1312, the network device determines whether the one or more end nodes are disconnected from the network device based on an event generated by at least one of a LAN host driver, a kernel generated netlink event, or a TCP control connection teardown. For example, as discussed supra, when the end node becomes disconnected from the mobile router 910, the disconnection is detected by a combination of events generated by LAN host drivers, kernel generated netlink events and TCP control connection teardown. Additional feature A at 1314 may be performed, as discussed in FIG. 14 infra.

Figure 14:
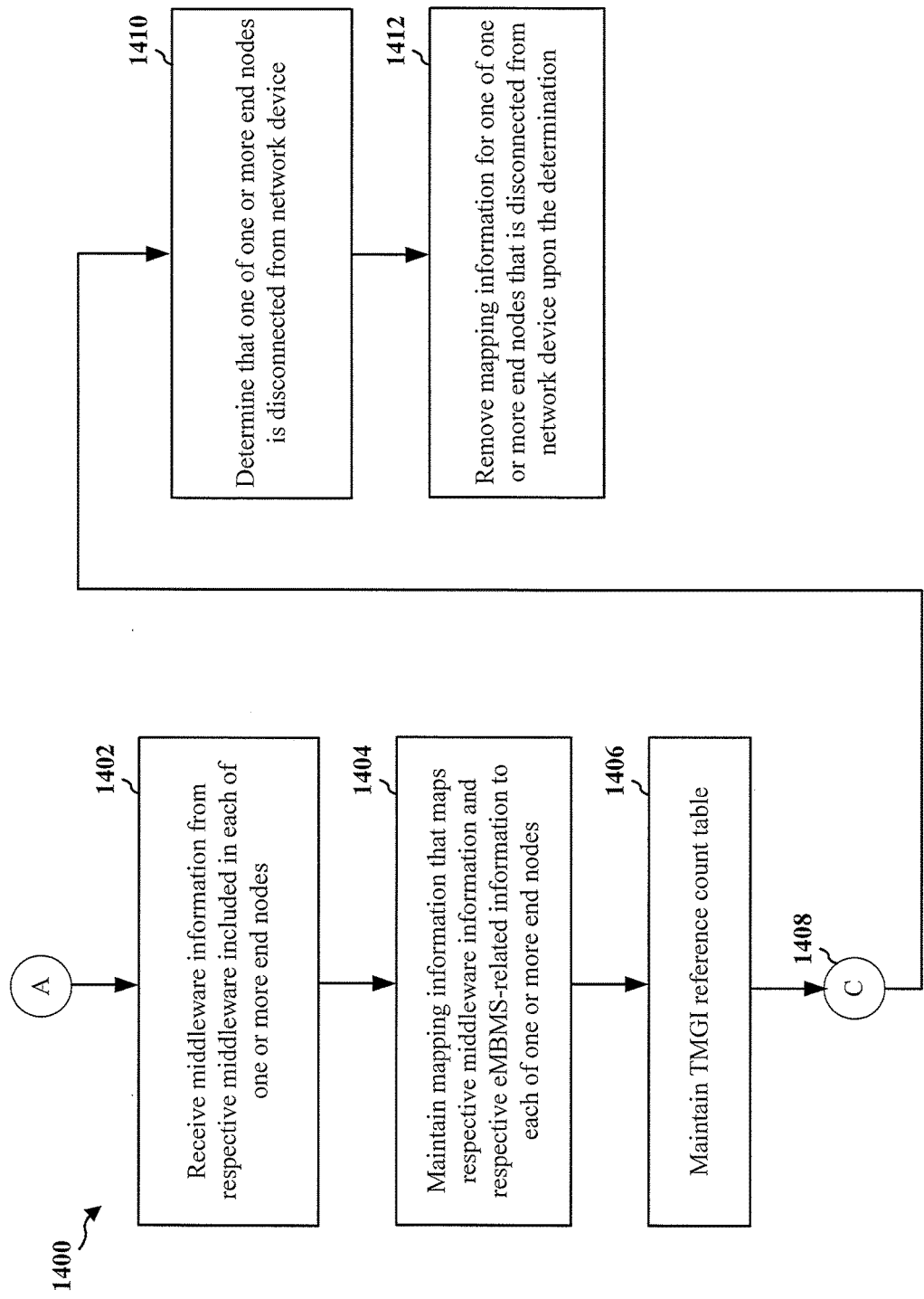
FIG. 14 is a flow chart of a method of wireless communication, expanding from the flow chart of FIG. 13.

FIG. 14 is a flow chart 1400 of a method of wireless communication, expanding from the flow chart 1300 of FIG. 13. The method may be performed by a network device (e.g., the UE 102, the UE 650, the network device 802, the apparatus 1802/1802') that is connected to an eNB and is also connected to end devices over LAN. At 1402, the network device receives middleware information from a respective middleware included in each of the one or more end nodes. At 1404, the network device maintains mapping information that maps respective middleware information and respective eMBMS-related information to each of the one or more end nodes. For example, as discussed supra, the multi-client handling module 916 collects middleware information from each end node's middleware and maintains information for each middleware. In particular, as discussed supra, the multi-client handling module 916 maps each end node with middleware information, eMBMS-related information, etc. In an aspect, the maintaining the mapping information includes maintaining a mapping table for the one or more end nodes. In an aspect, the respective middleware information includes an IP address of a corresponding end node, a UDP port number, and TCP port information, where the IP address of the corresponding end node and the UDP port number are used to determine a tunnel end point at the corresponding end node for a tunnel between the network device and the corresponding end node. In an aspect, the respective eMBMS-related information includes an indication indicating that the eMBMS service is enabled at the network device and TMGI session information. In an aspect, the mapping table maps each of the one or more end nodes with the IP address of the corresponding end node, the UDP port number for a tunnel between the network device and the corresponding end node, the TCP port information, the indication, and the TMGI session information. In an aspect, the mapping table for each of the one or more end nodes further includes a respective NAT IP address for each of the one or more end nodes.

Figure 15:
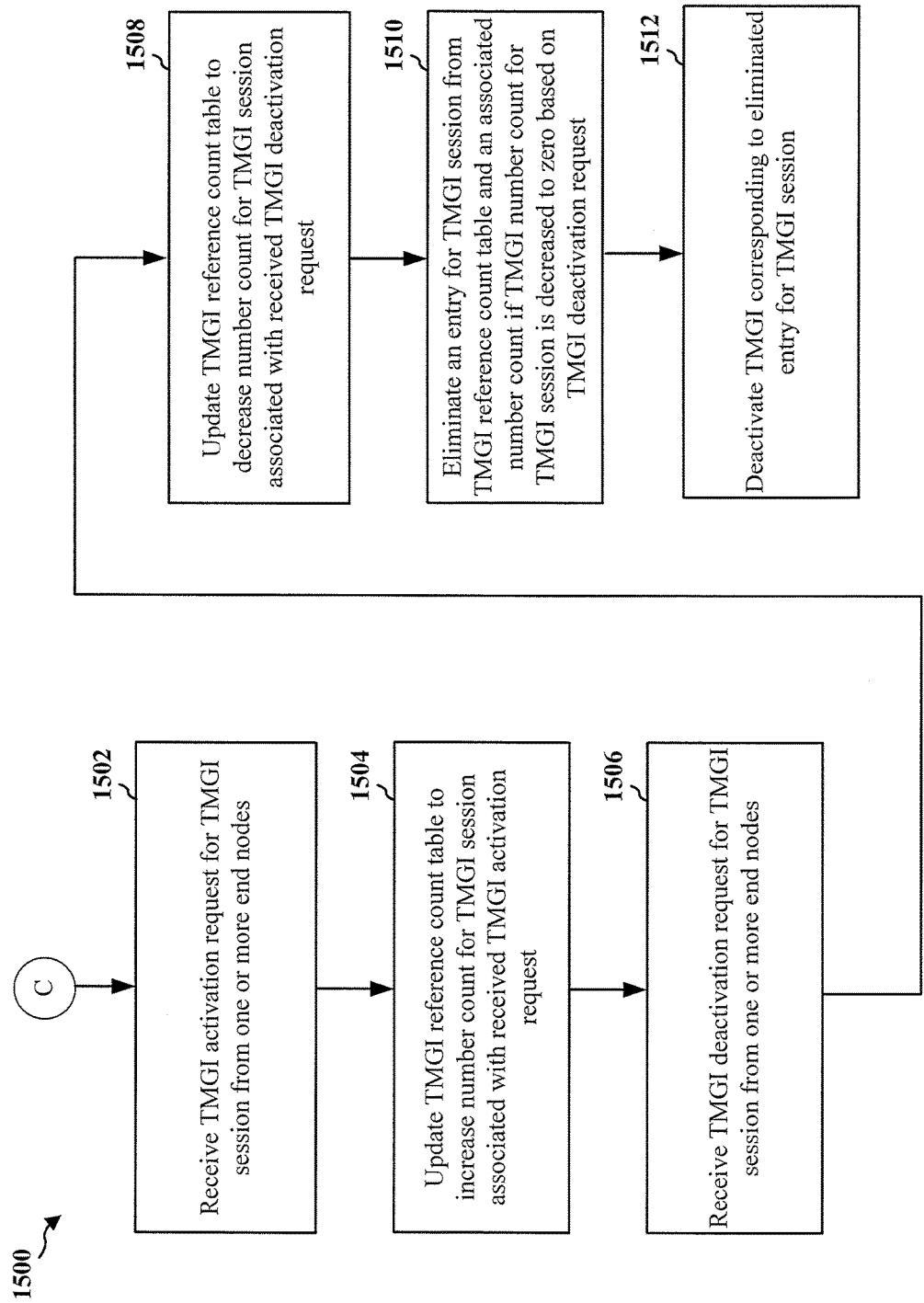
FIG. 15 is a flow chart of a method of wireless communication, expanding from the flow chart of FIG. 14.

At 1406, the network device maintains a TMGI reference count table. In an aspect, the TMGI reference count table includes one or more entries for respective one or more TMGI sessions, and each entry includes a number count of end nodes for a corresponding TMGI session. For example, as discussed supra, the multi-client handling module 916 may map a TMGI session with a reference count to indicate a number of end nodes utilizing the TMGI session. Maintaining the TMGI reference count table may include feature C at 1408, which is described in FIGS. 15 and 16 infra. At 1410, the network device determines that that one of the one or more end nodes is disconnected from the network device. At 1412, the network device removes mapping information for the one of the one or more end nodes that is disconnected from the network device upon the determination. For example, as discussed supra, if reducing the reference count for a TMGI session causes the reference count to become zero, then the multi-client handling module 916 removes the entry for that TMGI session from the TMGI reference count table and deactivates that TMGI session. For example, as discussed supra, if the reference count to become zero for the TMGI session, the multi-client handling module 916 may clear eMBMS-related information associated with all of the TMGI sessions for the end node in the LAN-eMBMS service mapping table FIG. 15 is a flow chart 1500 of a method of wireless communication, expanding from the flow chart 1400 of FIG. 14. The method may be performed by a network device (e.g., the UE 102, the UE 650, the network device 802, the apparatus 1802/1802') that is connected to an eNB and is also connected to end devices over LAN. At 1502, the network device receives a TMGI activation request for a TMGI session from the one or more end nodes. At 1504, the network device updates the TMGI reference count table to increase the number count for the TMGI session associated with the received TMGI activation request. For example, as discussed supra, if the requested TMGI session is already in the TMGI reference count table, the multi-client handling module increases a TMGI reference count associated with the TMGI session, without creating a new entry. At 1506, the network device receives a TMGI deactivation request for a TMGI session from the one or more end nodes. At 1508, the network device updates the TMGI reference count table to decrease the number count for the TMGI session associated with the received TMGI deactivation request. For example, as discussed supra, an end node may request the mobile router 910 to deactivate a TMGI session, and the multi-client handling module 916 reduces the reference count associated with the corresponding TMGI session in the TMGI reference count table. At 1510, the network device eliminates an entry for a TMGI session from the TMGI reference count table and an associated number count if the TMGI number count for the TMGI session is decreased to zero based on the TMGI deactivation request. At 1512, the network device deactivates a TMGI corresponding to the eliminated entry for the TMGI session. For example, as discussed supra, if reducing the reference count for the corresponding TMGI session causes the reference count to become zero, then the multi-client handling module 916 removes the entry for the corresponding TMGI session from the TMGI reference count table and deactivates the TMGI session.

Figure 16:
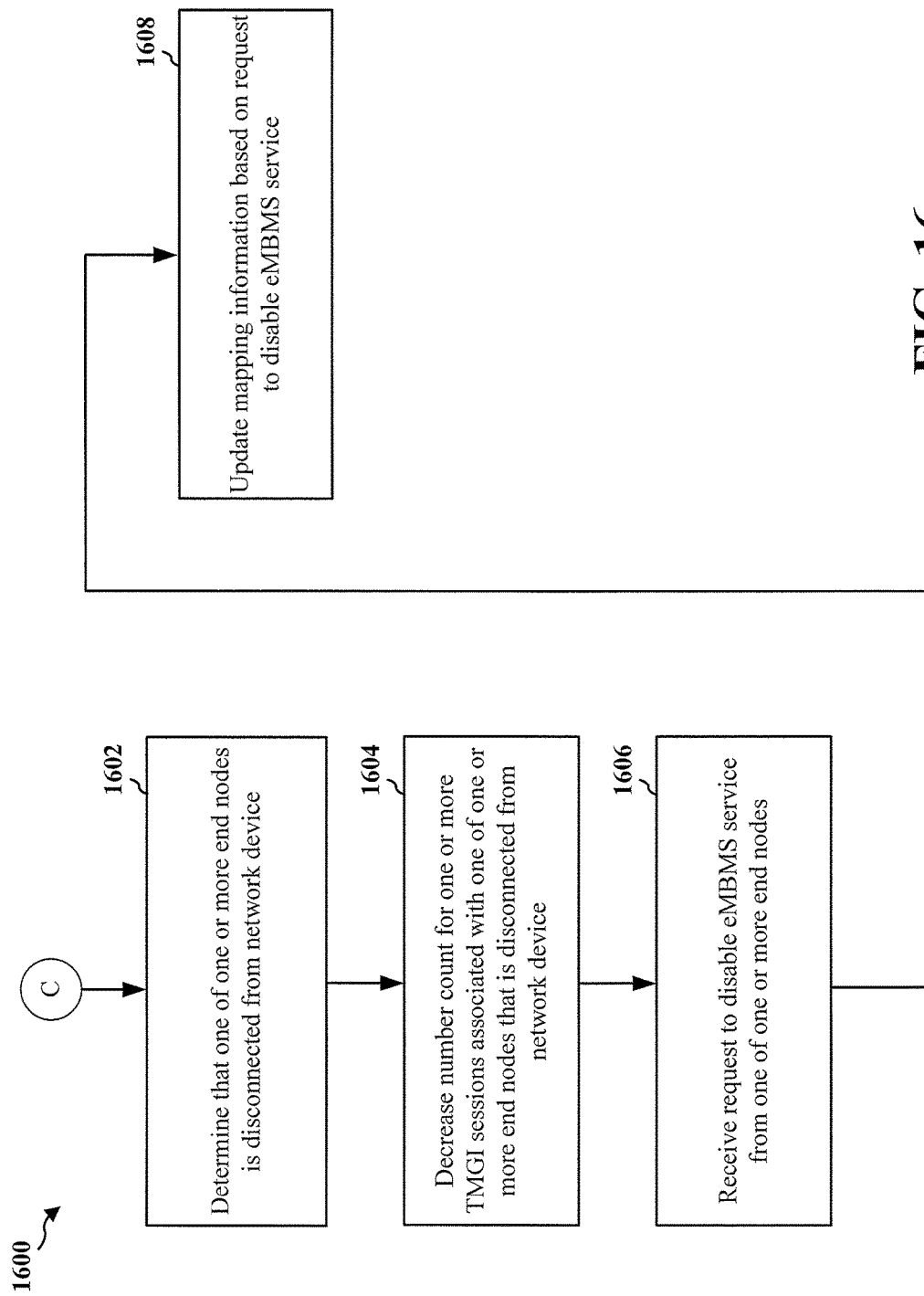
FIG. 16 is a flow chart of a method of wireless communication, expanding from the flow chart of FIG. 14.

FIG. 16 is a flow chart 1600 of a method of wireless communication, expanding from the flow chart 1400 of FIG. 14. The method may be performed by a network device (e.g., the UE 102, the UE 650, the network device 802, the apparatus 1802/1802') that is connected to an eNB and is also connected to end devices over LAN. At 1602, the network device determines that one of the one or more end nodes is disconnected from the network device. At 1604, the network device decreases a number count for one or more TMGI sessions associated with the one of the one or more end nodes that is disconnected from the network device. For example, as discussed supra, if an end node disconnects from the mobile router 910, the multi-client handling module 916 reduces the reference count for all the TMGI sessions associated with the corresponding end node in the TMGI reference count table. At 1606, the network device receives a request to disable an eMBMS service from one of the one or more end nodes. At 1608, the network device updates the mapping information based on the request to disable the eMBMS service. For example, as discussed supra, upon receiving the eMBMS service disable message, the multi-client handling module 916 clears eMBMS-related information associated with all of the TMGI sessions for the end node in the LAN-eMBMS service mapping table. For example, as discussed supra, the multi-client handling module 916 also reduces the reference count associated with all the TMGI sessions for the end node in the TMGI reference count table.

Figure 17:
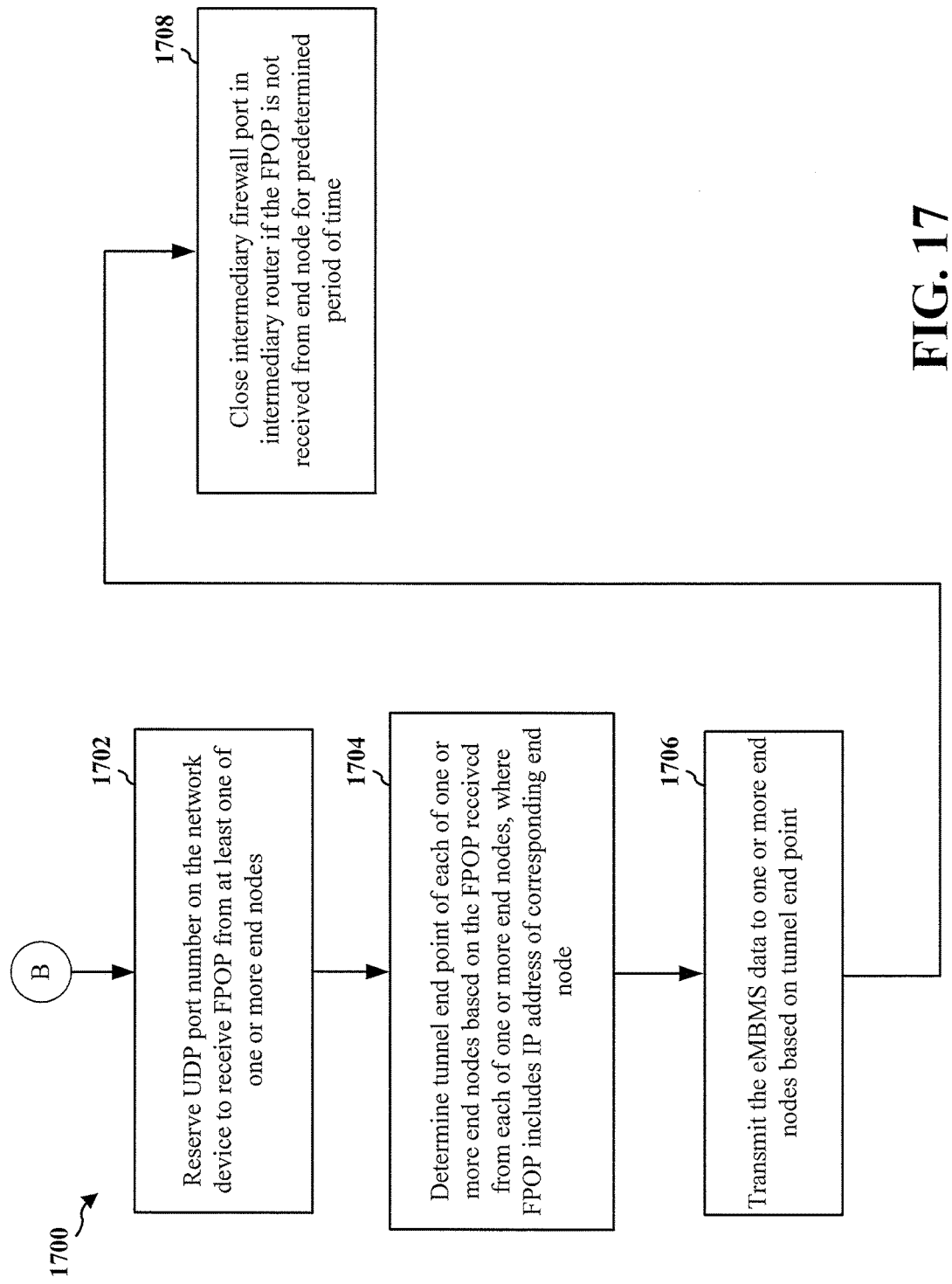
FIG. 17 is a flow chart of a method of wireless communication, expanding from the flow chart of FIG. 13.

FIG. 17 is a flow chart 1700 of a method of wireless communication, expanding from the flow chart 1300 of FIG. 13. The method may be performed by a network device (e.g., the UE 102, the UE 650, the network device 802, the apparatus 1802/1802') that is connected to an eNB and is also connected to end devices over LAN. The method in the flow chart 1700 may be performed in a case where the received eMBMS data is transmitted from the network device to one or more end nodes via the unicast transmission through an intermediary router connected to the one or more end nodes via the local area network. In an aspect, the intermediary router is configured to perform NAT. For example, as discussed supra, a main router (outdoor unit) 1110 is a network device that receives multicast eMBMS data from a network and subsequently provides unicast eMBMS data to a router/HGW 1130, and the router/HGW 1130 provides the unicast eMBMS to end nodes 1150a-1150c. At 1702, the network device reserves a UDP port number on the network device to receive an FPOP from at least one of the one or more end nodes. In an aspect, the FPOP is used to open an intermediary firewall port in the intermediary router for the unicast transmission of the eMBMS data to the at least one of the one or more end nodes. For example, as discussed supra, the main router 1110 reserves a TCP port for control packets over a TCP/IP session. For example, as discussed supra, the FPOP is used to open a port in an intermediate node (e.g., the router/HGW 1130), such that once TMGI is activated, the DL multicast traffic can flow through the router/HGW 1130 to the end nodes automatically. In an aspect, the FPOP includes an IP address of a corresponding end node. For example, as discussed supra, the middleware of the end node includes an IP address of the end node in a payload of the FPOP.

At 1704, the network device determines a tunnel end point of each of the one or more end nodes based on the FPOP received from each of the one or more end nodes, where the FPOP includes an IP address of a corresponding end node and a end node source port of the corresponding end node. In an aspect, the tunnel end point includes an IP address of a corresponding end node and a UDP port number on the intermediary router performing NAT. For example, as discussed supra, the tunnel module 1118 obtains the end node IP address from the payload of the FPOP received from the end node. For example, as discussed supra, the tunnel end point corresponding to the end node IP address is the same FPOP's source IP address and source port number. For example, as discussed supra, the tunnel module 1118 uses a FPOP server port number as a tunnel source port number for all destinations. At 1706, the network device transmits the eMBMS data to the one or more end nodes based on the tunnel end point. In an aspect, the intermediary firewall port in the intermediary router stays open if the FPOP is received periodically from the at least one of the one or more end nodes. At 1708, the network device closes the intermediary firewall port in the intermediary router if the FPOP is not received from the end node for a predetermined period of time. For example, as discussed supra, if an FPOP is not received for a predetermined time period, the tunnel module 1118 determines that the end node corresponding to the FPOP is disconnected. Thus, as discussed supra, the tunnel module 1118 deletes the tunnel end point corresponding to an end node after a predetermined period of time, unless the tunnel end point is refreshed by arrival of an FPOP from the same node.

Figure 18:
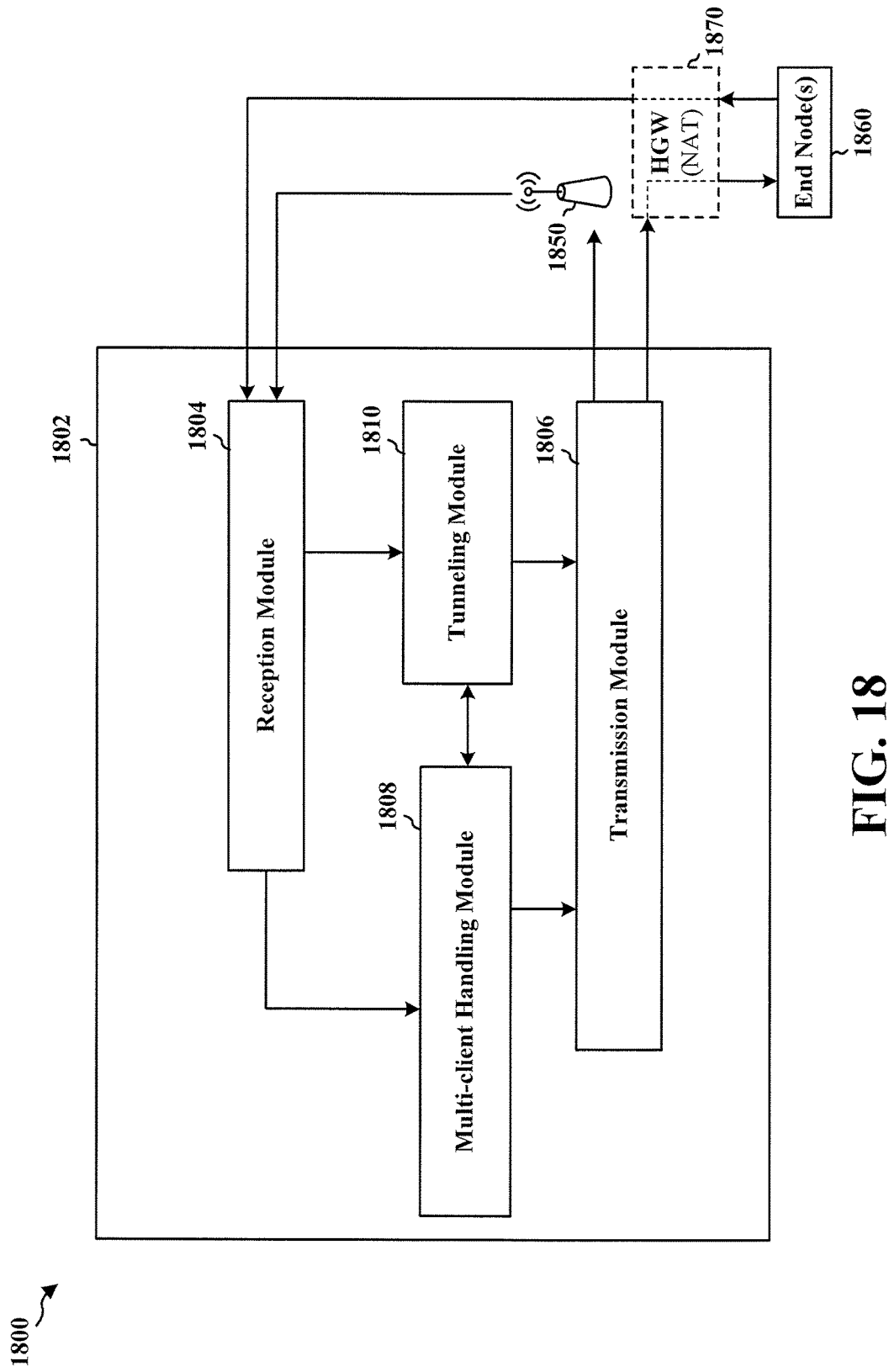
FIG. 18 is a conceptual data flow diagram illustrating the data flow between different modules/means/components in an exemplary apparatus.
Figure 19:
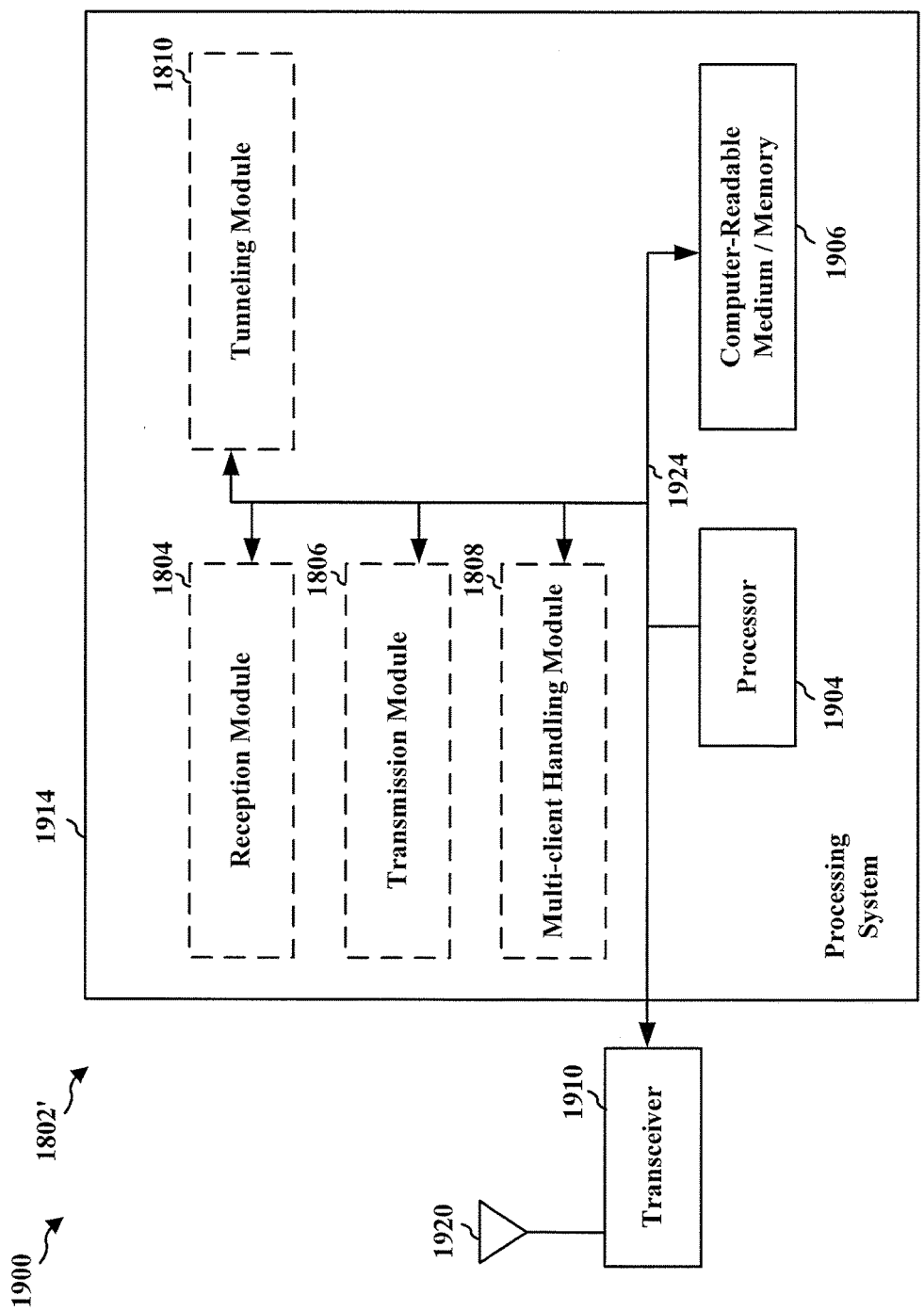
FIG. 19 is a diagram illustrating an example of a hardware implementation for an apparatus employing a processing system.

FIG. 18 is a conceptual data flow diagram 1200 illustrating the data flow between different modules/means/components in an exemplary apparatus 1802. The apparatus may be a network device (e.g., the UE 102, the UE 650, the network device 802). The apparatus includes a reception module 1804, a transmission module 1806, a multi-client handling module 1808, and a tunneling module 1810.

The reception module 1804 receives an eMBMS data from a base station 1850 via multicast transmission. The tunneling module 1810 transmits via the transmission module 1806 the received eMBMS data to one or more end nodes 1860 via unicast transmission. In an aspect, one or more end nodes 1860 are connected to the network device via a LAN. The reception module 1804 receives middleware information from a respective middleware included in each of the one or more end nodes 1860. The multi-client handling module 1808 maintains mapping information that maps respective middleware information and respective eMBMS-related information to each of the one or more end nodes 1860. In an aspect, the multi-client handling module 1808 maintains a mapping table for the one or more end nodes 1860. In an aspect, the respective middleware information includes an IP address of a corresponding end node, a UDP port number, and TCP port information, where the IP address of the corresponding end node and the UDP port number are used to determine a tunnel end point at the corresponding end node for a tunnel between the network device and the corresponding end node. In an aspect, the respective eMBMS-related information includes an indication indicating that the eMBMS service is enabled at the network device and temporary mobile group identity (TMGI) session information. In an aspect, the mapping table maps each of the one or more end nodes with the IP address of the corresponding end node, the UDP port number for a tunnel between the network device and the corresponding end node, the TCP port information, the indication, and the TMGI session information.

The multi-client handling module 1808 maintains a TMGI reference count table. In an aspect, the TMGI reference count table includes one or more entries for respective one or more TMGI sessions, and each entry includes a number count of end nodes for a corresponding TMGI session. The reception module 1804 receives a TMGI activation request for a TMGI session from the one or more end nodes 1860. The multi-client handling module 1808 updates the TMGI reference count table to increase the number count for the TMGI session associated with the received TMGI activation request. The reception module 1804 receives a TMGI deactivation request for a TMGI session from the one or more end nodes 1860. The multi-client handling module 1808 updates the TMGI reference count table to decrease the number count for the TMGI session associated with the received TMGI deactivation request. The multi-client handling module 1808 eliminates an entry for a TMGI session from the TMGI reference count table and an associated number count if the TMGI number count for the TMGI session is decreased to zero based on the TMGI deactivation request. The multi-client handling module 1808 deactivates a TMGI corresponding to the eliminated entry for the TMGI session.

The multi-client handling module 1808 determines that one of the one or more end nodes 1860 is disconnected from the network device 1802. The multi-client handling module 1808 removes mapping information for the one of the one or more end nodes 1860 that is disconnected from the network device upon the determination.

The multi-client handling module 1808 determines that one of the one or more end nodes 1860 is disconnected from the network device. The multi-client handling module 1808 decreases a number count for one or more TMGI sessions associated with the one of the one or more end nodes 1860 that is disconnected from the network device. The reception module 1804 receives a request to disable an eMBMS service from one of the one or more end nodes 1860. The multi-client handling module 1808 updates the mapping information based on the request to disable the eMBMS service. The tunneling module 1810 encapsulates the received eMBMS data in a unicast tunnel to the one or more end nodes 1860. In an aspect, the encapsulated eMBMS data is transmitted to the one or more end nodes 1860 via the unicast transmission. In an aspect, the tunneling module 1810 encapsulates the received eMBMS data by adding a unicast header including an IP address of an end node and a UDP header including a UDP port number to the received eMBMS data. In an aspect, the IP address of the end node and the UDP port number are used to determine a tunnel end point at the end node for a tunnel between the network device and the end node. In an aspect, the encapsulated eMBMS data is decapsulated by the eMBMS middleware of the end node to retrieve the received eMBMS data. In an aspect, a single unicast tunnel is established between the network device and each of the one or more end nodes 1860, and eMBMS data associated with one or more TMGI sessions is communicated to each end node via the single unicast tunnel.

The tunneling module 1810 determines whether the one or more end nodes are disconnected from the network device based on an event generated by at least one of a LAN host driver, a kernel generated netlink event, or a TCP control connection teardown. The tunneling module 1810 determines that more than one of the one or more end nodes 1860 request the eMBMS data, and replicates unicast packets for the eMBMS data for each of the one or more end nodes 1860 upon the determination. In an aspect, the replicated unicast packets are sent to each of the one or more end nodes 1860.

In an aspect, the received eMBMS data is transmitted from the network device to one or more end nodes 1860 via the unicast transmission through an intermediary router 1870 connected to the one or more end nodes 1860 via the LAN. In an aspect, the intermediary router 1870 is configured to perform NAT. In an aspect, the mapping table for each of the one or more end nodes 1860 further includes a respective NAT IP address for each of the one or more end nodes 1860. The tunneling module 1810 reserves a UDP port number on the network device to receive an FPOP from at least one of the one or more end nodes 1860. In an aspect, the FPOP is used to open an intermediary firewall port in the intermediary router 1870 for the unicast transmission of the eMBMS data to the at least one of the one or more end nodes 1860. In an aspect, the FPOP includes an IP address of a corresponding end node. The tunneling module 1810 determines a tunnel end point of each of the one or more end nodes 1860 based on the FPOP received from each of the one or more end nodes 1860, where the FPOP includes an IP address of a corresponding end node. In an aspect, the tunnel end point includes an IP address of a corresponding end node and a UDP port number on the intermediary router performing NAT.

The apparatus may include additional modules that perform each of the steps of the algorithm in the aforementioned flow charts of FIGS. 13-17. As such, each step in the aforementioned flow charts of FIGS. 13-17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

FIG. 18 is a diagram 1800 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, 1810, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception module 1804. In addition, the transceiver 1910 receives information from the processing system 1914, specifically the transmission module 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1804, 1806, 1808, and 1810. The modules may be software modules running in the processor 1904, resident/stored in the computer readable medium/memory 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1802/1802' for wireless communication includes means for receiving an eMBMS data from a base station via multicast transmission, and means for transmitting the received eMBMS data to one or more end nodes via unicast transmission, where the one or more end nodes are connected to the network device via a LAN. The apparatus 1802/1802' includes means for receiving middleware information from a respective middleware included in each of the one or more end nodes, and means for maintaining mapping information that maps respective middleware information and respective eMBMS-related information to each of the one or more end nodes. The apparatus 1802/1802' includes means for maintaining a mapping table for the one or more end nodes. In an aspect, the respective middleware information includes an IP address of a corresponding end node, a UDP port number, and TCP port information, where the IP address of the corresponding end node and the UDP port number are used to determine a tunnel end point at the corresponding end node for a tunnel between the network device and the corresponding end node. In an aspect, the respective eMBMS-related information includes an indication indicating that the eMBMS service is enabled at the network device and TMGI session information. In an aspect, the mapping table maps each of the one or more end nodes with the IP address of the corresponding end node, the UDP port number for a tunnel between the network device and the corresponding end node, the TCP port information, the indication, and the TMGI session information.

The apparatus 1802/1802' includes means for maintaining a TMGI reference count table, where the TMGI reference count table includes one or more entries for respective one or more TMGI sessions, and each entry includes a number count of end nodes for a corresponding TMGI session. The apparatus 1802/1802' includes means for receiving a TMGI activation request for a TMGI session from the one or more end nodes, and means for updating the TMGI reference count table to increase the number count for the TMGI session associated with the received TMGI activation request. The apparatus 1802/1802' includes means for receiving a TMGI deactivation request for a TMGI session from the one or more end nodes, and means for updating the TMGI reference count table to decrease the number count for the TMGI session associated with the received TMGI deactivation request. The apparatus 1802/1802' includes means for eliminating an entry for a TMGI session from the TMGI reference count table and an associated number count if the TMGI number count for the TMGI session is decreased to zero based on the TMGI deactivation request, and means for deactivating a TMGI corresponding to the eliminated entry for the TMGI session.

The apparatus 1802/1802' includes means for determining that one of the one or more end nodes is disconnected from the network device, and means for removing mapping information for the one of the one or more end nodes that is disconnected from the network device upon the determination. The apparatus 1802/1802' includes means for determining that one of the one or more end nodes is disconnected from the network device, and means for decreasing a number count for one or more TMGI sessions associated with the one of the one or more end nodes that is disconnected from the network device. The apparatus 1802/1802' includes means for receiving a request to disable an eMBMS service from one of the one or more end nodes, and updating the mapping information based on the request to disable the eMBMS service. The apparatus 1802/1802' means for encapsulating the received eMBMS data in a unicast tunnel to the one or more end nodes, where the encapsulated eMBMS data is transmitted to the one or more end nodes via the unicast transmission. The apparatus 1802/1802' includes means for determining whether the one or more end nodes are disconnected from the network device based on an event generated by at least one of a LAN host driver, a kernel generated netlink event, or a TCP control connection teardown. The apparatus 1802/1802' includes means for determining that more than one of the one or more end nodes request the eMBMS data, and means for replicating unicast packets for the eMBMS data for each of the one or more end nodes upon the determination, where the replicated unicast packets are sent to each of the one or more end nodes.

The apparatus 1802/1802' includes means for reserving a UDP port number on the network device to receive a FPOP from at least one of the one or more end nodes, where the FPOP is used to open an intermediary firewall port in the intermediary router for the unicast transmission of the eMBMS data to the at least one of the one or more end nodes. The apparatus 1802/1802' includes means for determining a tunnel end point of each of the one or more end nodes based on the FPOP received from each of the one or more end nodes, where the FPOP includes an IP address of a corresponding end node and the tunnel end point includes an IP address of a corresponding end node and a UDP port number on the intermediary router performing NAT, and means for transmitting the eMBMS data to the one or more end nodes based on the tunnel end point. The apparatus 1802/1802' includes means for closing the intermediary firewall port in the intermediary router if the FPOP is not received from the end node for a predetermined period of time. The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 20:
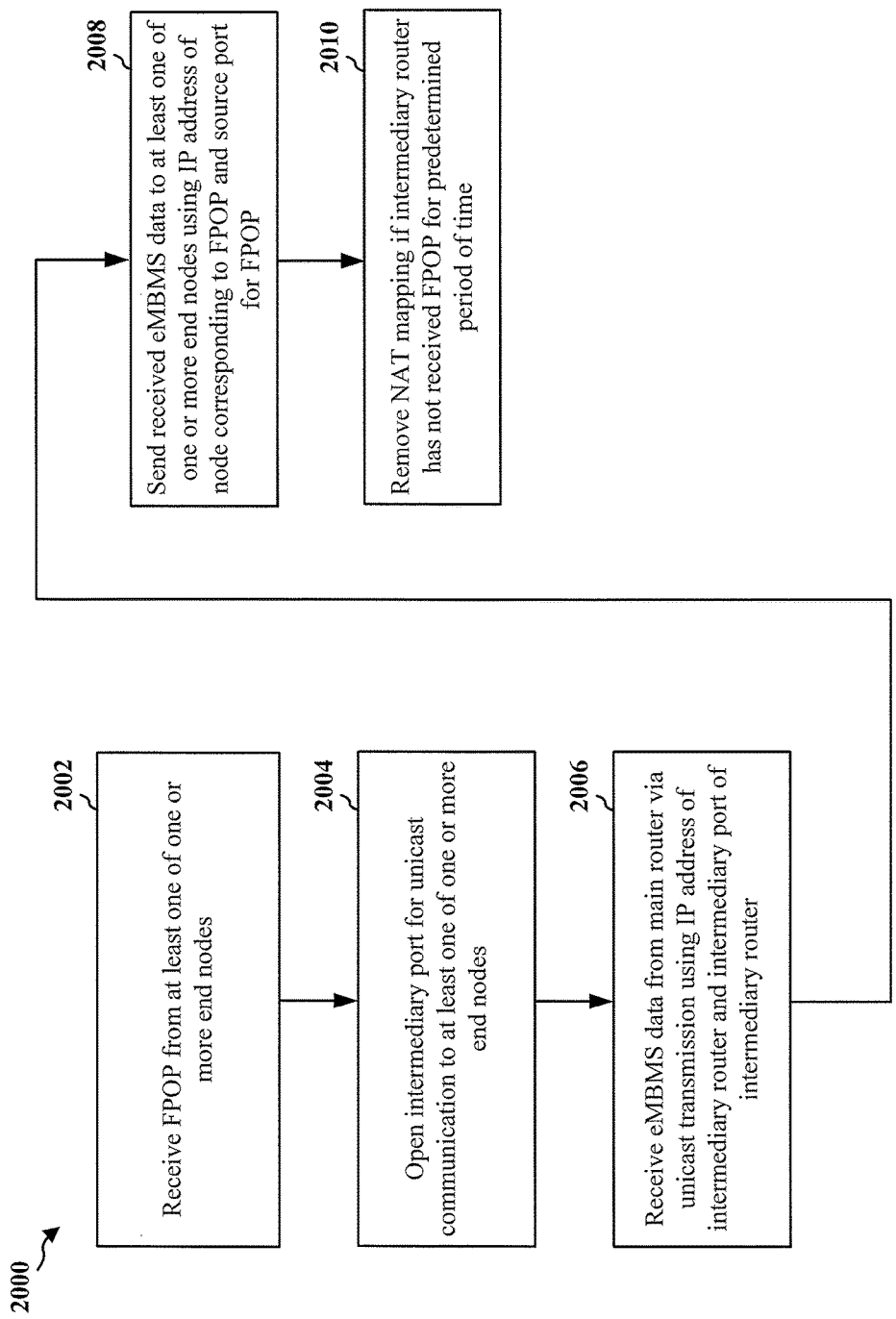
FIG. 20 is a flow chart of a method of wireless communication.

FIG. 20 is a flow chart 2000 of a method of wireless communication. The method may be performed by an intermediary router with a NAT feature (e.g., the router/HGW 1130, the apparatus 2202/2202') that is connected to a main router (e.g., the main router 1110) and is also connected to end devices over LAN. At 2002, the intermediary router receives an FPOP from at least one of one or more end nodes. In an aspect, the one or more end nodes are connected to the intermediate node over a LAN. At 2004, the intermediary router opens an intermediary port for unicast communication to the at least one of the one or more end nodes. In an aspect, the intermediary router opens the intermediary port by performing a NAT mapping from an IP address of a node corresponding to the FPOP and a source port for the FPOP to an IP address of the intermediary router and the intermediary port of the intermediary router. For example, referring back to FIG. 12, at 1224, the end node 1206 sends the FPOP to the home gateway 1204, which forwards the FPOP to the main router 1202 at 1226. For example, as discussed supra, when the home gateway 1204 receives the FPOP at 1224, the home gateway 1204 translates the IP address of the end node 1206 (IP_e) and the source port (udpZZZZ) to a public IP address (IP_h) and its corresponding port (udpTTTT), thus opening the port (udpTTTT) at the home gateway 1204.

At 2006, the intermediary router receives eMBMS data from the main router via unicast transmission using the IP address of the intermediary router and the intermediary port of the intermediary router. At 2008, the intermediary router sends the received eMBMS data to the at least one of the one or more end nodes using the IP address of the node corresponding to the FPOP and the source port for the FPOP. For example, referring back to FIG. 12, the main router 1202 forwards the tunneled multicast packet (a unicast packet) to the end node 1206 via 1204, at 1242, 1244, 1246, and 1248. For example, as discussed supra, because the port (udpTTTT) at the home gateway 1204 is opened, the packet received through the port (udpTTTT) at the home gateway 1204 may be tunneled to the source port (udpZZZZ) at the end node 1206. At 2010, the intermediary router removes the NAT mapping if the intermediary router has not received the FPOP for a predetermined period of time.

Figure 21:
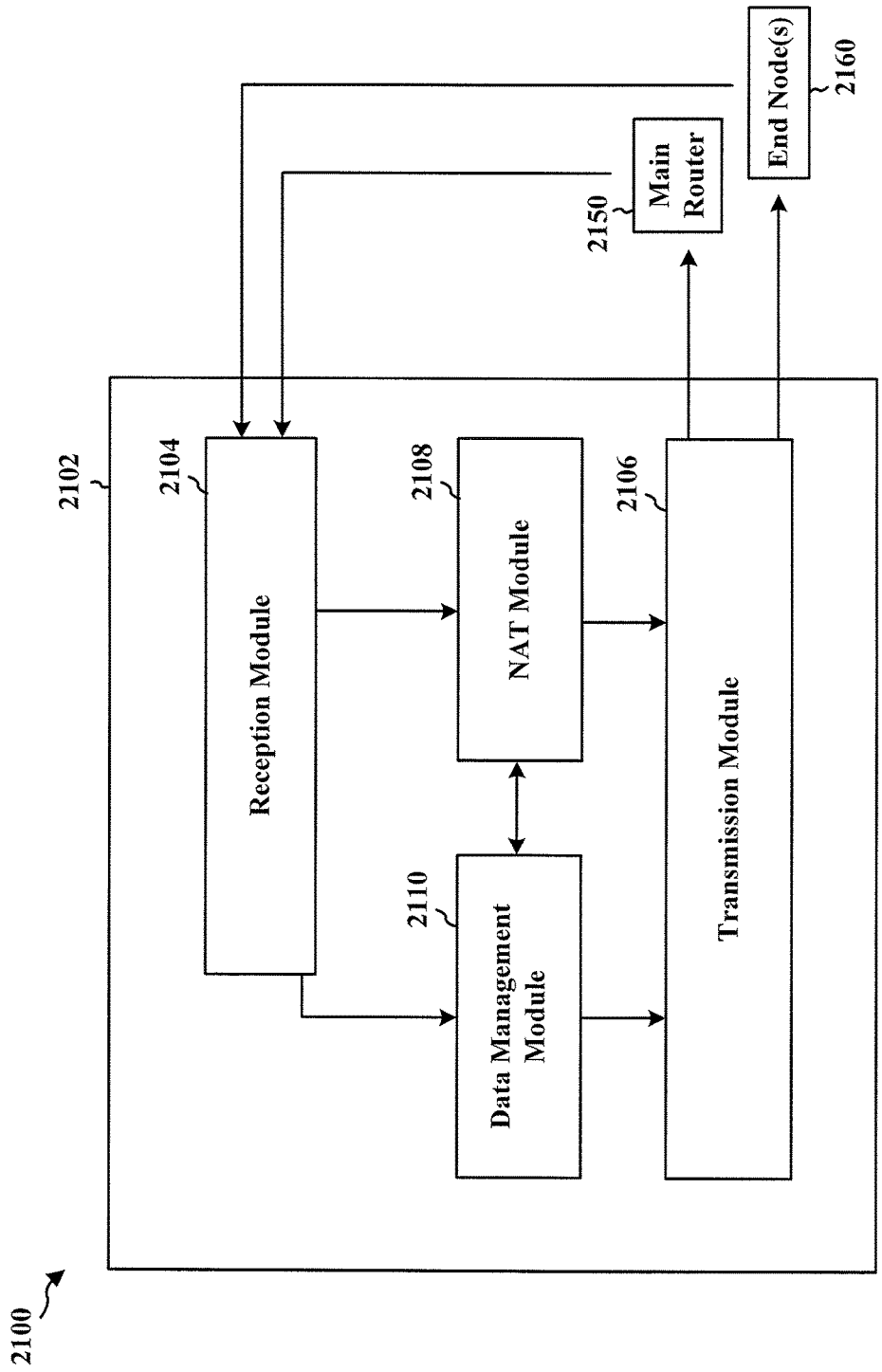
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 2102. The apparatus may be an intermediary router (e.g., the router/HGW 1130). The apparatus includes a reception module 2104, a transmission module 2106, a NAT module 2108, and a data management module 2110. For example, as discussed supra, if the FPOP packet is not received at the router/HGW 1130 for a predetermined period of time, the router/HGW 1130 no longer keeps the source port for the FPOP open.

The reception module 2104 receives an FPOP from at least one of one or more end nodes 2160. In an aspect, the one or more end nodes 2160 are connected to the intermediary router over a LAN. The NAT module 2108 opens an intermediary port for unicast communication to the at least one of the one or more end nodes 2160. In an aspect, the NAT module 2108 opens the intermediary port by performing a NAT mapping from an IP address of a node corresponding to the FPOP and a source port for the FPOP to an IP address of the intermediary router and the intermediary port of the intermediary router. The data management module 2110 receives via the reception module 2104 eMBMS data from the main router 2150 via unicast transmission using the IP address of the intermediary router and the intermediary port of the intermediary router. The data management module 2110 sends via the transmission module 2106 the received eMBMS data to the at least one of the one or more end nodes 2160 using the IP address of the node corresponding to the FPOP and the source port for the FPOP. The NAT module 2108 removes the NAT mapping if the intermediary router has not received the FPOP for a predetermined period of time.

The apparatus may include additional modules that perform each of the steps of the algorithm in the aforementioned flow charts of FIG. 20. As such, each step in the aforementioned flow charts of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
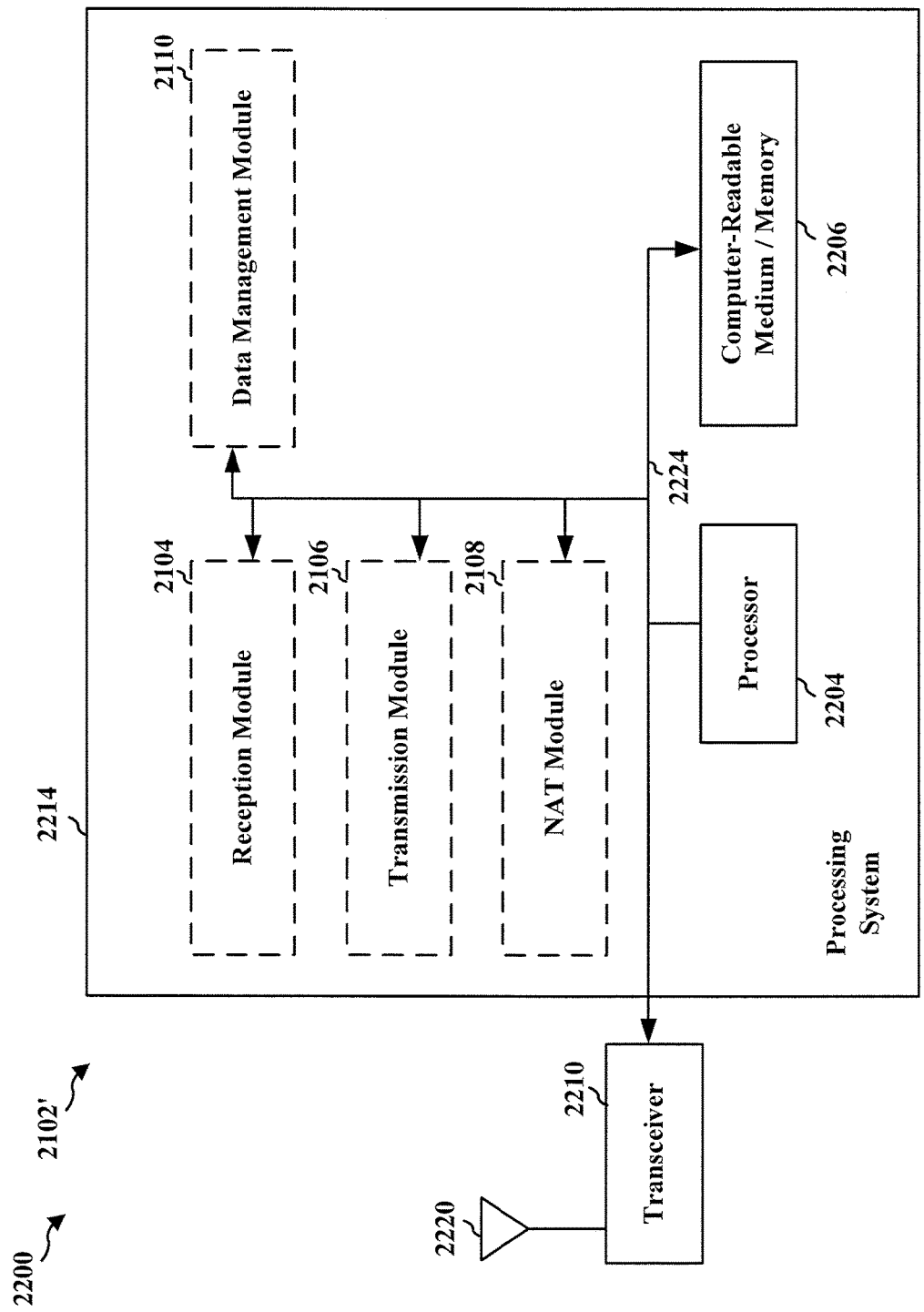
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2104, 2106, 2108, 2110, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception module 2104. In addition, the transceiver 2210 receives information from the processing system 2214, specifically the transmission module 2106, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system further includes at least one of the modules 2104, 2106, 2108, and 2110. The modules may be software modules running in the processor 2204, resident/stored in the computer readable medium/memory 2206, one or more hardware modules coupled to the processor 2204, or some combination thereof.

In one configuration, the apparatus 2102/2102' for wireless communication includes means for receiving an FPOP from at least one of one or more end nodes, means for opening an intermediary port for unicast communication to the at least one of the one or more end nodes, where the means for opening is configured to open the intermediary port by performing a NAT mapping from an IP address of a node corresponding to the FPOP and a source port for the FPOP to an IP address of the intermediary router and the intermediary port of the intermediary router, means for receiving eMBMS data from the main router via unicast transmission using the IP address of the intermediary router and the intermediary port of the intermediary router, means for sending the received eMBMS data to the at least one of the one or more end nodes using the IP address of the node corresponding to the FPOP and the source port for the FPOP, means for removing the NAT mapping if the intermediary router has not received the FPOP for a predetermined period of time. The aforementioned means may be one or more of the aforementioned modules of the apparatus 2102 and/or the processing system 2214 of the apparatus 2102' configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a network device, comprising:
   receiving, using a first Internet Protocol (IP) stack, an evolved multimedia broadcast multicast service (eMBMS) data from a base station via multicast transmission, wherein the eMBMS data comprises at least one raw eMBMS IP packet;
   encapsulating the at least one raw eMBMS IP packet in at least one unicast tunnel to eMBMS middleware comprised in one or more end nodes including attaching a unicast IP header and a user datagram protocol (UDP) header to the at least one raw eMBMS IP packet received from the base station, wherein the at least one raw eMBMS IP packet encapsulated in the at least one unicast tunnel comprises an eMBMS packet of the eMBMS data received from the base station;
   transmitting the encapsulated at least one raw eMBMS IP packet to the one or more end nodes via the at least one unicast tunnel using a second IP stack, wherein the one or more end nodes are connected to the network device via a local area network (LAN);
   receiving middleware information from a respective middleware included in each of the one or more end nodes; and
   maintaining mapping information in a mapping table for the one or more end nodes that maps respective middleware information and respective eMBMS-related information to each of the one or more end nodes, wherein the respective eMBMS-related information includes an indication indicating that the eMBMS service is enabled at the network device and temporary mobile group identity (TMGI) session information,
   wherein the respective middleware information includes an Internet protocol (IP) address of a corresponding end node, a user datagram protocol (UDP) port number, and transmission control protocol (TCP) port information, wherein the IP address of the corresponding end node and the UDP port number are used to determine a tunnel end point at the corresponding end node for a tunnel between the network device and the corresponding end node, and
   wherein the mapping table maps each of the one or more end nodes with the IP address of the corresponding end node, the UDP port number for a tunnel between the network device and the corresponding end node, the TCP port information, the indication, and the TMGI session information.

2. The method of claim 1, further comprising:
   maintaining a temporary mobile group identity (TMGI) reference count table,
      wherein the TMGI reference count table includes one or more entries for respective one or more TMGI sessions, and wherein each entry includes a number count of end nodes for a corresponding TMGI session.

3. The method of claim 2, further comprising:
   receiving a TMGI activation request for a TMGI session from the one or more end nodes; and
   updating the TMGI reference count table to increase the number count for the TMGI session associated with the received TMGI activation request.

4. The method of claim 2, further comprising:
   receiving a TMGI deactivation request for a TMGI session from the one or more end nodes; and
   updating the TMGI reference count table to decrease the number count for the TMGI session associated with the received TMGI deactivation request.

5. The method of claim 2, further comprising:
   eliminating an entry for a TMGI session from the TMGI reference count table and an associated number count if the TMGI number count for the TMGI session is decreased to zero based on the TMGI deactivation request; and
   deactivating a TMGI corresponding to the eliminated entry for the TMGI session.

6. The method of claim 2, further comprising:
   determining that one of the one or more end nodes is disconnected from the network device; and
   decreasing a number count for one or more TMGI sessions associated with the one of the one or more end nodes that is disconnected from the network device.

7. The method of claim 2, further comprising:
   receiving a request to disable an eMBMS service from one of the one or more end nodes; and
   updating the mapping information based on the request to disable the eMBMS service.

8. The method of claim 2, wherein a single unicast tunnel is established between the network device and each of the one or more end nodes, and
   wherein eMBMS data associated with one or more TMGI sessions is communicated to each end node via the single unicast tunnel.

9. The method of claim 1, further comprising:
   determining that one of the one or more end nodes is disconnected from the network device; and
   removing mapping information for the one of the one or more end nodes that is disconnected from the network device upon the determination.

10. The method of claim 1, wherein the encapsulated eMBMS data is decapsulated by eMBMS middleware of the end node to retrieve the received eMBMS data.

11. The method of claim 1, further comprising:
   determining whether the one or more end nodes are disconnected from the network device based on an event generated by at least one of a LAN host driver, a kernel generated netlink event, or a transmission control protocol (TCP) control connection teardown.

12. The method of claim 1, further comprising:
   determining that more than one of the one or more end nodes request the eMBMS data; and
   replicating unicast packets for the eMBMS data for each of the one or more end nodes upon the determination, wherein the replicated unicast packets are sent to each of the one or more end nodes.

13. The method of claim 1, wherein the received eMBMS data is transmitted from the network device to one or more end nodes via the unicast transmission through an intermediary router connected to the one or more end nodes via the LAN, and
wherein the intermediary router is configured to perform network address translation (NAT).

14. The method of claim 13, further comprising:
reserving the UDP port number on the network device to receive a Firewall Port Open Packet (FPOP) from at least one of the one or more end nodes,
wherein the FPOP is used to open an intermediary firewall port in the intermediary router for the unicast transmission of the eMBMS data to the at least one of the one or more end nodes.

15. The method of claim 14, wherein the FPOP includes an IP address of a corresponding end node.

16. The method of claim 14, further comprising:
determining the tunnel end point of each of the one or more end nodes based on the FPOP received from each of the one or more end nodes, wherein the FPOP includes an IP address of a corresponding end node, and wherein the tunnel end point includes an IP address of a corresponding end node and a UDP port number on the intermediary router performing NAT, wherein the eMBMS data is transmitted
to the one or more end nodes based on the tunnel end point.

17. The method of claim 14, wherein the intermediary firewall port in the intermediary router stays open if the FPOP is received periodically from the at least one of the one or more end nodes.

18. The method of claim 14, further comprising:
closing the intermediary firewall port in the intermediary router if the FPOP is not received from the end node for a predetermined period of time.

19. The method of claim 1, wherein the mapping table for each of the one or more end nodes further includes a respective network address translation (NAT) IP address for each of the one or more end nodes.

20. The method of claim 1, wherein the at least one raw eMBMS IP packet is encapsulated without decrypting the eMBMS data at the network device.

21. The method of claim 1, wherein the encapsulated at least one raw eMBMS IP packet maintains the encryption of the eMBMS data received from the base station.

22. The method of claim 1, wherein the encapsulated at least one raw eMBMS IP packet is tunneled to an end node for de-capsulation at the middleware comprised in the end node.

23. The method of claim 22, further comprising:
discovering a port opened by the middleware at the end node; and
opening and maintaining a unicast tunnel to the end node based on discovering the port, wherein the at least one raw eMBMS IP packet is tunneled to the end node via the unicast tunnel when the network device receives the eMBMS data.

24. The method of claim 23, wherein the unicast tunnel is maintained when the network device receives a periodic indication from the end node and is disconnected when the network device does not receive the periodic indication from the end node.

25. The method of claim 24, wherein the periodic indication comprises a Firewall Port Open Packet (FPOP) from the eMBMS middleware of the end node.

26. A network device for wireless communication, comprising:
means for receiving, using a first Internet Protocol (IP) stack, an evolved multimedia broadcast multicast service (eMBMS) data from a base station via multicast transmission, wherein the eMBMS data comprises at least one raw eMBMS IP packet;
means for encapsulating the at least one raw eMBMS IP packet in at least one unicast tunnel to eMBMS middleware comprised in one or more end nodes including attaching a unicast IP header and a user datagram protocol (UDP) header to the at least one raw eMBMS IP packet received from the base station, wherein the at least one raw eMBMS IP packet encapsulated in the at least one unicast tunnel comprises an eMBMS packet of the eMBMS data received from the base station;
means for transmitting the encapsulated at least one raw eMBMS IP packet to the one or more end nodes via the at least one unicast tunnel using a second IP stack, wherein the one or more end nodes are connected to the network device via a local area network (LAN);
means for receiving middleware information from a respective middleware included in each of the one or more end nodes; and
means for maintaining mapping information in a mapping table for the one or more end nodes that maps respective middleware information and respective eMBMS-related information to each of the one or more end nodes, wherein the respective eMBMS-related information includes an indication indicating that the eMBMS service is enabled at the network device and temporary mobile group identity (TMGI) session information,
wherein the respective middleware information includes an Internet protocol (IP) address of a corresponding end node, a user datagram protocol (UDP) port number, and transmission control protocol (TCP) port information, wherein the IP address of the corresponding end node and the UDP port number are used to determine a tunnel end point at the corresponding end node for a tunnel between the network device and the corresponding end node, and
wherein the mapping table maps each of the one or more end nodes with the IP address of the corresponding end node, the UDP port number for a tunnel between the network device and the corresponding end node, the TCP port information, the indication, and the TMGI session information.

27. The network device of claim 26, further comprising:
means for maintaining a temporary mobile group identity (TMGI) reference count table,
wherein the TMGI reference count table includes one or more entries for respective one or more TMGI sessions, and wherein each entry includes a number count of end nodes for a corresponding TMGI session.

28. The network device of claim 27, further comprising:
means for receiving a TMGI activation request for a TMGI session from the one or more end nodes; and
means for updating the TMGI reference count table to increase the number count for the TMGI session associated with the received TMGI activation request.

29. The network device of claim 27, further comprising:
means for receiving a TMGI deactivation request for a TMGI session from the one or more end nodes; and
means for updating the TMGI reference count table to decrease the number count for the TMGI session associated with the received TMGI deactivation request.

30. The network device of claim 27, further comprising:
means for eliminating an entry for a TMGI session from the TMGI reference count table and an associated number count if the TMGI number count for the TMGI session is decreased to zero based on the TMGI deactivation request; and
means for deactivating a TMGI corresponding to the eliminated entry for the TMGI session.

31. The network device of claim 27, further comprising:
means for determining that one of the one or more end nodes is disconnected from the network device; and
means for decreasing a number count for one or more TMGI sessions associated with the one of the one or more end nodes that is disconnected from the network device.

32. The network device of claim 27, further comprising:
means for receiving a request to disable an eMBMS service from one of the one or more end nodes; and
means for updating the mapping information based on the request to disable the eMBMS service.

33. The network device of claim 27, wherein a single unicast tunnel is established between the network device and each of the one or more end nodes, and
wherein eMBMS data associated with one or more TMGI sessions is communicated to each end node via the single unicast tunnel.

34. The network device of claim 26, further comprising:
means for determining that one of the one or more end nodes is disconnected from the network device; and
means for removing mapping information for the one of the one or more end nodes that is disconnected from the network device upon the determination.

35. The network device of claim 26, wherein the encapsulated eMBMS data is decapsulated by eMBMS middleware of the end node to retrieve the received eMBMS data.

36. The network device of claim 26, further comprising:
means for determining whether the one or more end nodes are disconnected from the network device based on an event generated by at least one of a LAN host driver, a kernel generated netlink event, or a transmission control protocol (TCP) control connection teardown.

37. The network device of claim 26, further comprising:
means for determining that more than one of the one or more end nodes request the eMBMS data; and
means for replicating unicast packets for the eMBMS data for each of the one or more end nodes upon the determination,
wherein the replicated unicast packets are sent to each of the one or more end nodes.

38. The network device of claim 26, wherein the received eMBMS data is transmitted from the network device to one or more end nodes via unicast transmission through an intermediary router connected to the one or more end nodes via the LAN, and
wherein the intermediary router is configured to perform network address translation (NAT).

39. The network device of claim 38, further comprising:
means for reserving the UDP port number on the network device to receive a Firewall Port Open Packet (FPOP) from at least one of the one or more end nodes,
wherein the FPOP is used to open an intermediary firewall port in the intermediary router for the unicast transmission of the eMBMS data to the at least one of the one or more end nodes.

40. The network device of claim 39, wherein the FPOP includes an IP address of a corresponding end node.

41. The network device of claim 39, further comprising:
means for determining the tunnel end point of each of the one or more end nodes based on the FPOP received from each of the one or more end nodes, wherein the FPOP includes an IP address of a corresponding end node, and wherein the tunnel end point includes an IP address of a corresponding end node and a UDP port number on the intermediary router performing NAT; and
means for transmitting the eMBMS data to the one or more end nodes based on the tunnel end point.

42. The network device of claim 39, wherein the intermediary firewall port in the intermediary router stays open if the FPOP is received periodically from the at least one of the one or more end nodes.

43. The network device of claim 39, further comprising:
means for closing the intermediary firewall port in the intermediary router if the FPOP is not received from the end node for a predetermined period of time.

44. The network device of claim 26, wherein the mapping table for each of the one or more end nodes further includes a respective network address translation (NAT) IP address for each of the one or more end nodes.

45. A network device for wireless communication, comprising:
a memory; and
at least one processor coupled to the memory and configured to:
receive, using a first Internet Protocol (IP) stack, an evolved multimedia broadcast multicast service (eMBMS) data from a base station via multicast transmission, wherein the eMBMS data comprises at least one raw eMBMS IP packet;
encapsulate the at least one raw eMBMS IP packet in at least one unicast tunnel to eMBMS middleware comprised in one or more end nodes including attaching a unicast IP header and a user datagram protocol (UDP) header to the at least one raw eMBMS IP packet received from the base station, wherein the at least one raw eMBMS IP packet encapsulated in the at least one unicast tunnel comprises an eMBMS packet of the eMBMS data received from the base station;
transmit the encapsulated at least one raw eMBMS IP packet to the one or more end nodes via the at least one unicast tunnel using a second IP stack, wherein the one or more end nodes are connected to the network device via a local area network (LAN);
receive middleware information from a respective middleware included in each of the one or more end nodes; and
maintain mapping information in a mapping table for the one or more end nodes that maps respective middleware information and respective eMBMS-related information to each of the one or more end nodes, wherein the respective eMBMS-related information includes an indication indicating that the eMBMS service is enabled at the network device and temporary mobile group identity (TMGI) session information,
wherein the respective middleware information includes an Internet protocol (IP) address of a corresponding end node, a user datagram protocol (UDP) port number, and transmission control protocol (TCP) port information, wherein the IP address of the corresponding end node and the UDP port number are used to determine a tunnel end point at the corresponding end node for a tunnel between the network device and the corresponding end node, and wherein the mapping table maps each of the one or more end nodes with the IP address of the corresponding end node, the UDP port number for a tunnel between the network device and the corresponding end node, the TCP port information, the indication, and the TMGI session information.

46. The network device of claim 45, wherein the at least one processor is further configured to:
maintain a temporary mobile group identity (TMGI) reference count table,
wherein the TMGI reference count table includes one or more entries for respective one or more TMGI sessions, and wherein each entry includes a number count of end nodes for a corresponding TMGI session.

47. The network device of claim 46, wherein the at least one processor is further configured to:
receive a TMGI activation request for a TMGI session from the one or more end nodes; and
update the TMGI reference count table to increase the number count for the TMGI session associated with the received TMGI activation request.

48. The network device of claim 46, wherein the at least one processor is further configured to:
receive a TMGI deactivation request for a TMGI session from the one or more end nodes; and
update the TMGI reference count table to decrease the number count for the TMGI session associated with the received TMGI deactivation request.

49. The network device of claim 46, wherein the at least one processor is further configured to:
eliminate an entry for a TMGI session from the TMGI reference count table and an associated number count if the TMGI number count for the TMGI session is decreased to zero based on the TMGI deactivation request; and
deactivate a TMGI corresponding to the eliminated entry for the TMGI session.

50. The network device of claim 46, wherein the at least one processor is further configured to:
determine that one of the one or more end nodes is disconnected from the network device; and
decrease a number count for one or more TMGI sessions associated with the one of the one or more end nodes that is disconnected from the network device.

51. The network device of claim 46, wherein the at least one processor is further configured to:
receive a request to disable an eMBMS service from one of the one or more end nodes; and
update the mapping information based on the request to disable the eMBMS service.

52. The network device of claim 46, wherein a single unicast tunnel is established between the network device and each of the one or more end nodes, and
wherein eMBMS data associated with one or more TMGI sessions is communicated to each end node via the single unicast tunnel.

53. The network device of claim 45, wherein the at least one processor is further configured to:
determine that one of the one or more end nodes is disconnected from the network device; and
remove mapping information for the one of the one or more end nodes that is disconnected from the network device upon the determination.

54. The network device of claim 45, wherein the encapsulated eMBMS data is decapsulated by eMBMS middleware of the end node to retrieve the received eMBMS data.

55. The network device of claim 45, wherein the at least one processor is further configured to:
determine whether the one or more end nodes are disconnected from the network device based on an event generated by at least one of a LAN host driver, a kernel generated netlink event, or a transmission control protocol (TCP) control connection teardown.

56. The network device of claim 45, wherein the at least one processor is further configured to:
determine that more than one of the one or more end nodes request the eMBMS data; and
replicate unicast packets for the eMBMS data for each of the one or more end nodes upon the determination,
wherein the replicated unicast packets are sent to each of the one or more end nodes.

57. The network device of claim 45, wherein the received eMBMS data is transmitted from the network device to one or more end nodes via the unicast transmission through an intermediary router connected to the one or more end nodes via the LAN, and
wherein the intermediary router is configured to perform network address translation (NAT).

58. The network device of claim 57, wherein the at least one processor is further configured to:
reserve the UDP port number on the network device to receive a Firewall Port Open Packet (FPOP) from at least one of the one or more end nodes,
wherein the FPOP is used to open an intermediary firewall port in the intermediary router for the unicast transmission of the eMBMS data to the at least one of the one or more end nodes.

59. The network device of claim 58, wherein the FPOP includes an IP address of a corresponding end node.

60. The network device of claim 58, wherein the at least one processor is further configured to:
determine the tunnel end point of each of the one or more end nodes based on the FPOP received from each of the one or more end nodes, wherein the FPOP includes an IP address of a corresponding end node, and wherein the tunnel end point includes an IP address of a corresponding end node and a UDP port number on the intermediary router performing NAT; and
transmit the eMBMS data to the one or more end nodes based on the tunnel end point.

61. The network device of claim 58, wherein the intermediary firewall port in the intermediary router stays open if the FPOP is received periodically from the at least one of the one or more end nodes.

62. The network device of claim 58, wherein the at least one processor is further configured to:
close the intermediary firewall port in the intermediary router if the FPOP is not received from the end node for a predetermined period of time.

63. The network device of claim 45, wherein the mapping table for each of the one or more end nodes further includes a respective network address translation (NAT) IP address for each of the one or more end nodes.

64. A non-transitory computer-readable medium storing computer executable code for wireless communication at a network device, comprising code to:
receive, using a first Internet Protocol (IP) stack, an evolved multimedia broadcast multicast service (eMBMS) data from a base station via multicast transmission, wherein the eMBMS data comprises at least one raw eMBMS IP packet;
encapsulate the at least one raw eMBMS IP packet in at least one unicast tunnel to eMBMS middleware comprised in one or more end nodes including attaching a unicast IP header and a user datagram protocol (UDP) header to the at least one raw eMBMS IP packet received from the base station, wherein the at least one raw eMBMS IP packet encapsulated in the at least one unicast tunnel comprises an eMBMS packet of the eMBMS data received from the base station;

transmit the encapsulated at least one raw eMBMS IP packet to the one or more end nodes via the at least one unicast tunnel using a second IP stack, wherein the one or more end nodes are connected to the network device via a local area network (LAN);

receive middleware information from a respective middleware included in each of the one or more end nodes; and maintain mapping information in a mapping table for the one or more end nodes that maps respective middleware information and respective eMBMS-related information to each of the one or more end nodes, wherein the respective eMBMS-related information includes an indication indicating that the eMBMS service is enabled at the network device and temporary mobile group identity (TMGI) session information, wherein the respective middleware information includes an Internet protocol (IP) address of a corresponding end node, a user datagram protocol (UDP) port number, and transmission control protocol (TCP) port information, wherein the IP address of the corresponding end node and the UDP port number are used to determine a tunnel end point at the corresponding end node for a tunnel between the network device and the corresponding end node, and wherein the mapping table maps each of the one or more end nodes with the IP address of the corresponding end node, the UDP port number for a tunnel between the network device and the corresponding end node, the TCP port information, the indication, and the TMGI session information.

65. The computer-readable medium of claim 64, further comprising code to:
maintain a temporary mobile group identity (TMGI) reference count table,
wherein the TMGI reference count table includes one or more entries for respective one or more TMGI sessions, and wherein each entry includes a number count of end nodes for a corresponding TMGI session.

66. The computer-readable medium of claim 65, further comprising code to:
receive a TMGI activation request for a TMGI session from the one or more end nodes; and
update the TMGI reference count table to increase the number count for the TMGI session associated with the received TMGI activation request.

67. The computer-readable medium of claim 65, further comprising code to:
receive a TMGI deactivation request for a TMGI session from the one or more end nodes; and
update the TMGI reference count table to decrease the number count for the TMGI session associated with the received TMGI deactivation request.

68. The computer-readable medium of claim 65, further comprising code to:
determine that one of the one or more end nodes is disconnected from the network device; and
decrease a number count for one or more TMGI sessions associated with the one of the one or more end nodes that is disconnected from the network device.

69. The computer-readable medium of claim 65, further comprising code to:
receive a request to disable an eMBMS service from one of the one or more end nodes; and
update the mapping information based on the request to disable the eMBMS service.

70. The computer-readable medium of claim 65, wherein a single unicast tunnel is established between the network device and each of the one or more end nodes, and
wherein eMBMS data associated with one or more TMGI sessions is communicated to each end node via the single unicast tunnel.

71. The computer-readable medium of claim 65, further comprising code to:
eliminate an entry for a TMGI session from the TMGI reference count table and an associated number count if the TMGI number count for the TMGI session is decreased to zero based on the TMGI deactivation request; and
deactivate a TMGI corresponding to the eliminated entry for the TMGI session.

72. The computer-readable medium of claim 64, further comprising code to:
determine that one of the one or more end nodes is disconnected from the network device; and
remove mapping information for the one of the one or more end nodes that is disconnected from the network device upon the determination.

73. The computer-readable medium of claim 64, wherein the encapsulated eMBMS data is decapsulated by eMBMS middleware of the end node to retrieve the received eMBMS data.

74. The computer-readable medium of claim 64, further comprising code to:
determine whether the one or more end nodes are disconnected from the network device based on an event generated by at least one of a LAN host driver, a kernel generated netlink event, or a transmission control protocol (TCP) control connection teardown.

75. The computer-readable medium of claim 64, further comprising code to:
determine that more than one of the one or more end nodes request the eMBMS data; and
replicate unicast packets for the eMBMS data for each of the one or more end nodes upon the determination,
wherein the replicated unicast packets are sent to each of the one or more end nodes.

76. The computer-readable medium of claim 64, wherein the received
eMBMS data is transmitted from the network device to one or more end nodes via the unicast transmission through an intermediary router connected to the one or more end nodes via the LAN, and
wherein the intermediary router is configured to perform network address translation (NAT).

77. The computer-readable medium of claim 76, further comprising code to:
reserve the UDP port number on the network device to receive a Firewall Port Open Packet (FPOP) from at least one of the one or more end nodes,
wherein the FPOP is used to open an intermediary firewall port in the intermediary router for the unicast transmission of the eMBMS data to the at least one of the one or more end nodes.

78. The computer-readable medium of claim 77, wherein the FPOP includes an IP address of a corresponding end node.

79. The computer-readable medium of claim 77, further comprising code to:
- determine the tunnel end point of each of the one or more end nodes based on the FPOP received from each of the one or more end nodes, wherein the FPOP includes an IP address of a corresponding end node, and wherein the tunnel end point includes an IP address of a corresponding end node and a UDP port number on the intermediary router performing NAT; and
- transmit the eMBMS data to the one or more end nodes based on the tunnel end point.

80. The computer-readable medium of claim 77, wherein the intermediary firewall port in the intermediary router stays open if the FPOP is received periodically from the at least one of the one or more end nodes.

81. The computer-readable medium of claim 77, further comprising code to:
- close the intermediary firewall port in the intermediary router if the FPOP is not received from the end node for a predetermined period of time.

82. The computer-readable medium of claim 64, wherein the mapping table for each of the one or more end nodes further includes a respective network address translation (NAT) IP address for each of the one or more end nodes.

* * * * *